(12) United States Patent
Ferren et al.

(10) Patent No.: US 7,647,487 B2
(45) Date of Patent: Jan. 12, 2010

(54) INSTRUCTION-ASSOCIATED PROCESSOR RESOURCE OPTIMIZATION

(75) Inventors: Bran Ferren, Beverly Hills, CA (US); W. Daniel Hillis, Encino, CA (US); Nathan P. Myhrvold, Medina, WA (US); Clarence T. Tegreene, Bellevue, WA (US); Lowell L. Wood, Jr., Livermore, CA (US)

(73) Assignee: Searete, LLC, Bellevue, WA (US)

( * ) Notice: Subject to any disclaimer, the term of this patent is extended or adjusted under 35 U.S.C. 154(b) by 0 days.

(21) Appl. No.: 11/540,910

(22) Filed: Sep. 28, 2006

(65) Prior Publication Data

US 2007/0050556 A1 Mar. 1, 2007

Related U.S. Application Data

(63) Continuation-in-part of application No. 11/214,449, filed on Aug. 29, 2005, and a continuation-in-part of application No. 11/214,459, filed on Aug. 29, 2005, and a continuation-in-part of application No. 11/214,458, filed on Aug. 29, 2005.

(51) Int. Cl.
G06F 7/38 (2006.01)
G06F 9/00 (2006.01)
G06F 9/44 (2006.01)
G06F 15/00 (2006.01)

(52) U.S. Cl. .................... 712/229
(58) Field of Classification Search ........... 712/23, 712/229
See application file for complete search history.

(56) References Cited

U.S. PATENT DOCUMENTS

| 4,484,275 | A | 11/1984 | Katzman et al. |
|---|---|---|---|
| 4,639,864 | A | 1/1987 | Katzman et al. |
| 4,654,819 | A | 3/1987 | Stiffler et al. |
| 4,672,537 | A | 6/1987 | Katzman et al. |
| 4,751,639 | A | 6/1988 | Corcoran et al. |
| 4,807,116 | A | 2/1989 | Katzman et al. |
| 4,817,091 | A | 3/1989 | Katzman et al. |
| 4,819,154 | A | 4/1989 | Stiffler et al. |
| 4,847,755 | A | 7/1989 | Morrison et al. |
| 4,891,787 | A | 1/1990 | Gifford |
| 5,084,891 | A | 1/1992 | Ariyavisitakul et al. |
| 5,212,777 | A | 5/1993 | Gove et al. |
| 5,475,856 | A | 12/1995 | Kogge |

(Continued)

OTHER PUBLICATIONS

Balasubramonian et al.; Memory Hierarchy Reconfiguration for Energy and Performance in General-Purpose Processor Architectures; 2000; IEEE; pp. 1-13.*

(Continued)

*Primary Examiner*—Eddie P Chan
*Assistant Examiner*—Corey S Faherty

(57) ABSTRACT

Embodiments include a device and a method. In an embodiment, a method applies a first resource management strategy to a first resource associated with a first processor and executes an instruction block in a first processor. The method also applies a second resource management strategy to a second resource of a similar type as the first resource and executes the instruction block in a second processor. The method further selects a resource management strategy likely to provide a substantially optimum execution of the instruction group from the first resource management strategy and the second resource management strategy.

25 Claims, 19 Drawing Sheets

U.S. PATENT DOCUMENTS

| | | | |
|---|---|---|---|
| 5,526,313 | A | 6/1996 | Etoh et al. |
| 5,535,405 | A | 7/1996 | Byers et al. |
| 5,691,870 | A | 11/1997 | Gebara |
| 5,764,953 | A * | 6/1998 | Collins et al. .................. 703/17 |
| 5,768,551 | A * | 6/1998 | Bleiweiss et al. ........... 710/316 |
| 5,774,736 | A | 6/1998 | Wright et al. |
| 5,966,528 | A | 10/1999 | Wilkinson et al. |
| 6,021,489 | A | 2/2000 | Poplingher |
| 6,052,773 | A | 4/2000 | DeHon et al. |
| 6,098,030 | A | 8/2000 | McMinn |
| 6,199,095 | B1 | 3/2001 | Robinson |
| 6,205,537 | B1* | 3/2001 | Albonesi ..................... 712/43 |
| 6,216,236 | B1 | 4/2001 | Miyao et al. |
| 6,247,118 | B1 | 6/2001 | Zumkehr et al. |
| 6,324,643 | B1 | 11/2001 | Krishnan et al. |
| 6,374,349 | B1 | 4/2002 | McFarling |
| 6,427,206 | B1 | 7/2002 | Yeh et al. |
| 6,496,056 | B1 | 12/2002 | Shoji |
| 6,625,750 | B1 | 9/2003 | Duso et al. |
| 6,763,452 | B1 | 7/2004 | Hohensee et al. |
| 6,766,419 | B1 | 7/2004 | Zahir et al. |
| 6,877,084 | B1 | 4/2005 | Christie |
| 6,924,790 | B1 | 8/2005 | Bi |
| 6,954,845 | B2 | 10/2005 | Arnold et al. |
| 6,954,923 | B1 | 10/2005 | Yates, Jr. et al. |
| 7,093,147 | B2 | 8/2006 | Farkas et al. |
| 7,539,852 | B2* | 5/2009 | Ferren et al. ................ 712/229 |
| 2001/0011346 | A1 | 8/2001 | Yoshimi |
| 2001/0020267 | A1 | 9/2001 | Koino |
| 2001/0021974 | A1 | 9/2001 | Lee |
| 2001/0025338 | A1 | 9/2001 | Zumkehr et al. |
| 2001/0032309 | A1 | 10/2001 | Henry et al. |
| 2001/0047467 | A1 | 11/2001 | Yeh et al. |
| 2002/0032718 | A1 | 3/2002 | Yates et al. |
| 2002/0087828 | A1 | 7/2002 | Arimilli et al. |
| 2002/0095666 | A1 | 7/2002 | Tabata et al. |
| 2002/0112227 | A1 | 8/2002 | Kramskoy et al. |
| 2002/0124196 | A1 | 9/2002 | Morrow et al. |
| 2002/0144247 | A1 | 10/2002 | Tirumalai et al. |
| 2002/0184385 | A1 | 12/2002 | Kato |
| 2003/0005265 | A1 | 1/2003 | Barowski et al. |
| 2003/0005419 | A1 | 1/2003 | Pieper et al. |
| 2003/0074649 | A1 | 4/2003 | Poulsen et al. |
| 2003/0079113 | A1 | 4/2003 | Nguyen et al. |
| 2003/0101443 | A1 | 5/2003 | Kosche et al. |
| 2003/0135771 | A1 | 7/2003 | Cupps et al. |
| 2003/0200537 | A1 | 10/2003 | Barsness et al. |
| 2003/0200539 | A1 | 10/2003 | Fu et al. |
| 2004/0003309 | A1 | 1/2004 | Cai et al. |
| 2004/0073894 | A1 | 4/2004 | Chen et al. |
| 2004/0073899 | A1 | 4/2004 | Luk et al. |
| 2004/0093591 | A1 | 5/2004 | Kalogeropulos et al. |
| 2004/0103410 | A1 | 5/2004 | Sakai |
| 2004/0153749 | A1 | 8/2004 | Schwarm et al. |
| 2004/0174944 | A1 | 9/2004 | Uht |
| 2004/0225871 | A1 | 11/2004 | Irie et al. |
| 2005/0005203 | A1 | 1/2005 | Czajkowski |
| 2005/0066153 | A1 | 3/2005 | Sharangpani et al. |
| 2005/0086650 | A1 | 4/2005 | Yates, Jr. et al. |
| 2005/0093607 | A1 | 5/2005 | Marshall et al. |
| 2005/0132238 | A1 | 6/2005 | Nanja |
| 2005/0138478 | A1 | 6/2005 | Safford et al. |
| 2005/0149915 | A1 | 7/2005 | Wu et al. |
| 2005/0155026 | A1 | 7/2005 | DeWitt, Jr. et al. |
| 2005/0240814 | A1 | 10/2005 | Sasakura et al. |
| 2005/0246613 | A1 | 11/2005 | Blaauw et al. |
| 2006/0020838 | A1 | 1/2006 | Tschanz et al. |
| 2006/0020852 | A1 | 1/2006 | Bernick et al. |
| 2006/0101303 | A1 | 5/2006 | Bower, III et al. |
| 2006/0181857 | A1 | 8/2006 | Belady et al. |
| 2006/0202713 | A1 | 9/2006 | Shumarayev |
| 2006/0202714 | A1 | 9/2006 | Hoang et al. |
| 2006/0206882 | A1 | 9/2006 | Illowsky et al. |
| 2006/0212753 | A1 | 9/2006 | Sato |
| 2007/0006178 | A1 | 1/2007 | Tan |
| 2007/0050555 | A1 | 3/2007 | Ferren et al. |
| 2007/0050557 | A1 | 3/2007 | Ferren et al. |
| 2007/0050558 | A1 | 3/2007 | Ferren et al. |
| 2007/0050581 | A1 | 3/2007 | Mangione-Smith |
| 2007/0050582 | A1 | 3/2007 | Mangione-Smith |
| 2007/0050604 | A1 | 3/2007 | Ferren et al. |
| 2007/0050605 | A1 | 3/2007 | Ferren et al. |
| 2007/0050606 | A1 | 3/2007 | Ferren et al. |
| 2007/0050607 | A1 | 3/2007 | Ferren et al. |
| 2007/0050608 | A1 | 3/2007 | Ferren et al. |
| 2007/0050609 | A1 | 3/2007 | Ferren et al. |
| 2007/0050659 | A1 | 3/2007 | Ferren et al. |
| 2007/0050660 | A1 | 3/2007 | Ferren et al. |
| 2007/0050661 | A1 | 3/2007 | Ferren et al. |
| 2007/0050672 | A1 | 3/2007 | Mangione-Smith |
| 2007/0050775 | A1 | 3/2007 | Ferren et al. |
| 2007/0050776 | A1 | 3/2007 | Ferren et al. |
| 2007/0055848 | A1 | 3/2007 | Ferren et al. |
| 2007/0067611 | A1 | 3/2007 | Ferren et al. |
| 2007/0074173 | A1 | 3/2007 | Ferren et al. |

OTHER PUBLICATIONS

Juan, Sanjeevan & Navarro; Dynamic History-Length Fitting: A third level of adaptivity for branch prediction; 1998, IEEE, pp. 155-166.*

Suh et al.; Dynamic Partitioning of Shared Cache Memory; 2002; pp. 1-23.*

Gummaraju et al.; Branch Prediction in Multi-Threaded Processors; 2000; IEEE; pp. 179-188.*

Chang, Po-Yung et al.; "Branch Classification: A New Mechanism for Improving Branch Prediction Performance"; International Journal of Parallel Programming; 1994; pp. 22-31; Ann Arbor, USA.

Kundu, Partha, et al.; "A Case for Shared Instruction Cache on Chip Multiprocessors running OLTP"; ACM SIGARCH Computer Architecture News; Jun. 2004; pp. 11-18; vol. 32, No. 3; ACM Press.

Rotenberg, Eric et al.; "Trace Cache: A Low Latency Approach to High Bandwidth Instruction Fetching"; International Symposium on Microarchitecture; 1996; pp. 24-34; IEEE.

Sodani, Avinash et al.; "Dynamic Instruction Reuse"; ISCA; Jun. 1997; pp. 1-12; ACM Press.

"Bayes' theorem"; Facts, Info and Encyclopedia article; pp. 1-6; located at: http://absoluteastronomy.com/encyclopedia/b/ba/bayes_theoreml.htm; printed on Aug. 27, 2005.

"Bayes' theorem"; Wikipedia, the free encyclopedia; pp. 1-6; located at: http://en.wikipedia.org/wiki/Bayes_theorem; printed on Aug. 27, 2005.

"Bayesian inference"; Wikipedia, the free encyclopedia; pp. 1-9; located at: http://en.wikipedia.org/wiki/Bayesian_inference#Evidence_and_the_scientific_method; printed on Aug. 27, 2005.

"Bayesian logic"; A Whatis.com definition; p. 1; located at: http://whatis.techtarget.com/definition/0,,sid9_gci548993,00.html; printed on Aug. 19, 2005.

"Bayesian probability"; Wikipedia, the free encyclopedia; pp. 1-4; located at: http://en.wikipedia.org/wiki/Bayesianism; printed on Aug. 27, 2005.

Calder, Brad; Grunwald, Dirk; Lindsay, Donald; Martin, James; Mozer, Michael; Zorn, Benjamin; "Corpus-based Static Branch Prediction"; pp. 1-14; located at: http://www.cse.ucsd.edu/~calder/papers/PLDI-95-ESP.pdf.

Gomez, Faustino J.; Burger, Doug; Miikkulainen, Risto; "A Neuroevolution Method for Dynamic Resource Allocation on a Chip Multiprocessor"; bearing a date of 2001; pp. 1-6; printed on Aug. 25, 2005.

McFarling, Scott; "Combining Branch Predictors"; WRL Technical Note TN-36; Jun. 1993; pp. 1-29; located at: http://www.hpl.hp.com/techreports/Compaq-DEC/WRL-TN-36.pdf; printed on Aug. 30, 2005.

Storkey, Amos; Amos Storkey-Research-Belief Networks; "Tutorial: Introduction to Belief Networks"; 2000-2005; pp. 1-8; located at: http://ww.anc.ed.ac.uk/~amos/belief.html; printed on Aug. 27, 2005.

Wu, Youfeng; Larus, James R.; "Static Branch Frequency and Program Profile Analysis," pp. 1-11; bearing dates of Nov. 1994 and 1994; located at: http://citeseer.ist.psu.edu/cache/papers/cs/1353/ftp:zSzzSzftp.cs.wisc.eduzSztech-reportszSzreportszSz94zSztr1248.pdf/wu94static.pdf; printed on Aug. 25, 2005.

U.S. Appl. No. 11/541,473, Ferren et al.
U.S. Appl. No. 11/541,450, Ferren et al.
U.S. Appl. No. 11/526,190, Ferren et al.
U.S. Appl. No. 11/526,145, Ferren et al.
U.S. Appl. No. 11/364,573, Ferren et al.
U.S. Appl. No. 11/364,131, Ferren et al.
U.S. Appl. No. 11/364,130, Ferren et al.
U.S. Appl. No. 11/343,927, Ferren et al.
U.S. Appl. No. 11/343,745, Ferren et al.
U.S. Appl. No. 11/324,174, Ferren et al.
U.S. Appl. No. 11/292,323, Ferren et al.
U.S. Appl. No. 11/292,296, Ferren et al.
U.S. Appl. No. 11/292,207, Ferren et al.
U.S. Appl. No. 11/291,503, Ferren et al.
U.S. Appl. No. 11/214,459, Ferren et al.
U.S. Appl. No. 11/214,458, Ferren et al.
U.S. Appl. No. 11/214,449, Ferren et al.

Albonesi, David H., "Dynamic IPC/Clock Rate Optimization", 1998, pp. 282-292, $25^{th}$ International Symposium On Computer Architecture, IEEE Computer Society.

Balasubramonian, Rajeev; Albonesi, David; Buyuktosunoglu, Alper; Dwarkadas, Sandhya, "Dynamic Memory Hierarchy Performance Optimization", 2000, pp. 1-11, IEEE.

Balasubramonian, Rajeev; Albonesi, David; Buyuktosunoglu, Alper; Dwarkadas, Sandhya, "Memory Hierarchy Reconfiguration For Energy And Performance In General-Purpose Processor Architectures", 2000, pp. 1-13, IEEE.

Juan, Toni; Sanjeevan, Sanji; Navarro, Juan J., "Dynamic History-Length Fitting: A Third Level Of Adaptivity For Branch Prediction", bearing a date of 1998, pp. 155-166, IEEE.

Veidenbaum, Alexander V.; Tang, Weiyu; Gupta, Rajesh; Nicolau, Alexandru; Ji, Xiaomei, "Adapting Cache Line Size To Application Behavior", 1999, pp. 145-154, $13^{th}$ International Conference On Supercomputing, ACM Press.

Evers, Marius; Chang, Po-Yung; Patt, Yale N.; "Using Hybrid Branch Predictors To Improve Branch Prediction Accuracy In The Presence Of Context Switches"; 1996; pp. 3-11; Proceedings of the $23^{rd}$ annual international symposium on computer architecture; ACM Press.

Mitra et al.; "Robust System Design from Unreliable Components"; 2005 Penn State University; retrieved Sep. 17, 2007; pp. 1-252; located at http://www.cse.psu.edu/~yuanxie/isca05.pdf.

Nair et al.; "Exploiting Instruction Level Parallelism in Processors by Caching Scheduled Groups"; May 1997; pp. 13-25.

Shen et al.; "Modern Processor Design: Fundamentals of Superscalar Processors"; 2002; McGraw Hill; Beta Edition; p. 423 (3 pages included).

Jacobsen, Erik; Rotenberg, Eric; Smith, J. E.; "Assigning Confidence to Conditional Branch Predictions"; Proceedings of the $29^{th}$ Annual International Symposium on Microarchitecture; pp. 1-12; bearing a date of Dec. 2-4, 1996, Paris, France; IEEE; USA.

Klauser, Artur; Paithankar, Abhijit; Grunwald, Dirk; "Selective Eager Execution on the PolyPath Architecture"; pp. 1-10; University of Colorado, Department of Computer Science, Boulder, Colorado; bearing a date of Jul. 1998; IEEE; ISCA.

Patel, Sanjay J., Lumetta, Steven S.; "rePlay: A Hardware Framework for Dynamic Optimization"; bearing a date of Jun. 2001; pp. 590-607; IEEE Transactions on Computers; vol. 50, No. 6; IEEE.

Austin, Todd; "DIVA: A Reliable substrate for Deep Submicron Microarchitecture Design"; Advanced Computer Architecture Lab; pp. 1-12; University of Michigan; located at http://huron.cs.ucdavis.edu/Micro32/presentations/p_austin.pdf; printed on Feb. 6, 2006.

Austin, Todd; "DIVA: A Reliable substrate for Deep Submicron Microarchitecture Design"; ACM Portal; Bearing dates of 1999 and 2006; pp. 1-6; Association for Computing Machinery; located at http://portal.acm.org/citation.cfm?id=320111; printed on Feb. 6, 2006.

Bala, Vasanth; Duesterwald, Evelyn; Banerjia, Sanjeev; "Dynamo: A Transparent Dynamic Optimization System"; Hewlett-Packard Labs; Bearing a date of 2000, printed on Nov. 10, 2005; pp. 1-12; ACM; Vancouver, Canada.

Chatterjee, Saugata; Weaver, Chris; Austin, Todd; "Efficient Checker Processor Design"; pp. 1-11; University of Michigan; located at http://www.eecs.umich.edu/~taustin/papers/MICRO33-divadesign.pdf; printed on Feb. 6, 2006.

"Cisco 12000 Single Event Upset Failures Overview and Work Around Summary"; Cisco Systems; Bearing dates of Aug. 15, 2003, Dec. 13, 2004, and 1992-2005; pp. 1-2; printed on Feb. 17, 2006; located at http://www.cisco.com/en/US/products/hw/routers/ps167/products_field_notice09186a00801b3df8.shtml.

Conte, Thomas M.; Sathaye, Sumedh W.; Banerjia, Sanjeev; "A Persistent Rescheduled-Page Cache for Low Overhead Object Code Compatibility in VLIW Architectures"; Bearing a date of 1996, printed on Nov. 10, 2005; pp. 4-13; IEEE.

"Core Plane Voltage"; The PC Guide; bearing dates of Apr. 17, 2001 and 1997-2004; pp. 1; located at http://www.pcguide.com/ref/mbsys/bios/set/cpuCore-c.html; printed on Mar. 1, 2006.

"Cosmic ray"; Wikipedia, the free encyclopedia; Bearing a date of Feb. 9, 2006; pp. 1-3; printed on Feb. 17, 2006; located at http://en.wikipedia.org/wiki/Cosmic_ray.

"CPU Power Plane"; The PC Guide; bearing dates of Apr. 17, 2001 and 1997-2004; pp. 1; located at http://www.pcguide.com/ref/mbsys/bios/set/cpuPower-c.html; printed on Mar. 1, 2006.

Dehnert, James C.; Grant, Brian K.; Banning, John P.; Johnson, Richard; Kistler, Thomas; Klaiber, Alexander; Mattson, Jim; "The Transmeta Code Morphing™ Software: Using Speculation, Recovery, and Adaptive Retranslation to Address Real-Life Challenges"; Proceedings of the First Annual IEEE/ACM International Symposium on Code Generation and Optimization, Mar. 27-29, 2003, San Francisco, California; Bearing a date of 2003, printed on Nov. 10, 2005; pp. 1-10; IEEE.

Ernst, Dan; Kim, Nam Sung; Das, Shidhartha; Pant, Sanjay; Pham, Toan; Rao, Rajeev; Ziesler, Conrad; Blaauw, David; Austin, Todd; Mudge, Trevor; Flautner, Krisztian; "Razor: A Low-Power Pipeline Based on Circuit-Level Timing Speculation"; Abstract; Bearing a date of Jun. 6,2003; pp. 1-23; located at http://www.gigascale.org/pubs/426/razor.submit.authors.pdf; printed on Jul. 7, 2006.

Fisher, Joseph A.; "Walk-Time Techniques: Catalyst for Architectural Change"; Computer; Bearing dates of Sep. 1997 and 1997, printed on Nov. 10, 2005; pp. 40-42; IEEE.

Georgi, Shirley; "The $41^{st}$ Power Sources Conference A Challenge to Create Portable Power Sources for a Victorious Military"; pp. 1-4; located at http://www.batteriesdigest.com/power_sources_military.htm; printed on Mar. 15, 2006.

Harris, Tim; Marlow, Simon; Jones, Simon Peyton; Herlihy, Maurice; "Composable Memory Transactions"; PPoPP'05; Bearing dates of Jun. 15-17, 2005 and 2005, printed on Oct. 6, 2005; pp. 1-13; Chicago, Illinois; ACM.

Hazelwood, Kim; Smith, Michael D.; "Characterizing Inter-Execution and Inter-Application Optimization Persistence"; printed on Jan. 30, 2006; pp. 1-8; Harvard University; located at www.cs.virginia.edu/kim/docs/traces.pdf.

"Infrastructure for Profile Driven Optimizations"; GNU Project; Bearing dates of Aug. 29, 2001 and Jul. 11, 2005, printed on Nov. 9, 2005; pp. 1-4; Free Software Foundation, Inc.; located at http://gcc.gnu.org/news/profiledriven.html.

Kaeli, David; "Profile-guided Instruction and Data Memory Layout"; pp. 1-12; located at: http://www.ece.neu.edu/info/architecture/publications/Tufts.pdf; printed on Dec. 12, 2005.

Knies, Rob; "Concurrent Programming Enters Atomic Age"; Microsoft Research News and Highlights; Bearing a date of 2005, printed on Oct. 6, 2005; pp. 1-3; Microsoft Corporation; located at http://research.microsoft.com/displayArticle.aspx?id=1313.

Lount, Peter William; "Dynamic Runtime Type-Object-Class Inference"; Smalltalk.org™; Bearing dates of Nov. 23, 2005 and 2004, printed on Nov. 23, 2005; pp. 1-3; version 1, 20050914; located at http://www.smalltalk.org/articles/article_20050914_a2_Dynamic_Type-Object-Class_Inference.html.

Machanick, Philip; "Macintelligence: Instruction Basics"; MacOpinion; Bearing a date of Jul. 3, 2001, printed on Nov. 16, 2005; pp. 2-6; located at http://www.macopinion.com/columns/intelligence/01/07/03/.

Moore, Charles W.; "The PowerBook Mystique Laptop Batteries, And Why The Portable Power Source Future May Be Something Other (Plus Mailbag)"; PowerBookCentral.com; bearing dates of 1996-2006; pp. 1-10; Macmarkets; located at http://powerbookcentral.com/columns/hildreth_moore/batt.shtml; printed on Mar. 15, 2006.

"Performance and Tuning: Basics"; Sybase; Adaptive Server Enterprise; Bearing dates of Aug. 2003, and 1989-2003; pp. 40-43 (6 pages total); 12.5.1; printed on Mar. 22, 2006.

"Performance Management Guide: Performance Overview of the Virtual Memory Manager (VMM)"; printed on Nov. 1, 2005; pp. 1-11; located at http://publibn.boulder.ibm.com/doc_link/en_US/a_doc_lib/aixbman/prftungd/2365c22.htm.

"Profile-Based Optimization: HP C Programmer's Guide"; HP 3000 Manuals; printed on Nov. 9, 2005; pp. 1-4; located at http://docs.hp.com/cgi-bin/doc3k/B9243490008.13256/29.

Sato, Toshinori; "Data Dependence Speculation Using Data Address Prediction and its Enhancement with Instruction Reissue";24th Euromicro Conference; Bearing a date of 1998; pp. 1-2 (pp. 10285); vol. 1; IEEE, Inc.; located at: http://csdl2.computer.org/persagen/DLAbsToc.jsp?resourcePath=/dl/proceedings/&toc=comp/proceedings/euromicro/1998/8646/01/8646toc.xml&DOI=10.1109/EURMIC.1998.711812; printed on Dec. 8, 2005.

"Semantics of the Task_Region Construct"; bearing a date of Feb. 10, 2006; printed on Mar. 22, 2006; p. 1; Google.com; located at http://72.14.203.104/search?q=cache:mpmaTDSemccj:dacnet.rice.edu/Depts/versions/.

Sites, Richard L.; Chernoff, Anton; Kirk, Matthew B.; Marks, Maurice P.; Robinson, Scott G.; "Binary Translation"; Communications of the ACM; Bearing a date of Feb. 1993, printed on Nov. 10, 2005; pp. 69-81; vol. 36, No. 2; ACM.

"Speculative Execution"; Wikipedia The Free Encyclopedia; Bearing a date of Aug. 3, 2005, printed on Oct. 7, 2005; pp. 1-1; located at http://en.wikipedia.org/wiki/Speculative_execution.

Uht, Augustus K.; "TEAtime: Timing Error Avoidance for Performance Enhancement and Environment Adaptation"; URI Road Show, Spring 2003; pp. 1-22; located at www.ele.uri.edu/~uht/talks/TEAtimeroadshow2003.Dist.pdf; printed on Feb. 3, 2006.

Uht, Augustus K.; "Uniprocessor Performance Enhancement Through Adaptive Clock Frequency Control"; SSGRR2003w Conference; pp. 1-10; located at http://www.ele.uri.edu/~uht/papers/SSGRR2003wFnlUht.pdf; printed on Feb. 6, 2006.

Uht, Augustus; Vaccaro, Rick; "TEAPC: Adaptive Computing and Underclocking in a Real PC"; MuRI Technical Report No. 20041027-1; Oct. 27, 2004; pp. 1-13; located at http://www.ele.uri.edu/~uht/papers/MuRI-TR-20041027.pdf; printed on Feb. 6, 2006.

Uht, Gus; Vaccaro, Rick; "Adaptive Computing ( . . . via Timing Error Avoidance)"; bearing dates of Jan. 21, 2005 and 2003-5; pp. 1-24; located at http://www.lems.brown.edu/~iris/BARC2005/Webpage/BARCpresentations/uht.pdf; printed on Feb. 6, 2006.

Yacktman, Don; "Freeze Dried Objects"; Stepwise.com; Bearing dates of Jun. 27, 2005 and 1994-2000; pp. 1-2; located at: http://www.stepwise.com/Articles/Technical/FreezeDriedObjects.html; printed on Dec. 15, 2005.

Zhang, Lixin; Mckee, Sally A.; Hsieh, Wilson C.; Carter, John B.; "Pointer-Based Prefetching within the Impulse Adaptable Memory Controller: Initial Results"; pp. 1-11; located at: http://www.cs.utah.edu/impulse/papers/isca00ws.pdf; printed on Dec. 7, 2005.

U.S. Appl. No. 12/454,633, Ferren et al.

Razdan et al.; "A High-Performance Microarchitecture with Hardware-Programmable Functional Units"; Bearing a date of 1994; pp. 172-180; Association of Computing Machinery (ACM); San Jose, CA.

U.S. Appl. No. 12/321,027, Ferren et al.

U.S. Appl. No. 12/319,696, Ferren et al.

Mano, M. Morris; "Computer System Architecture, Third Edition"; bearing a date of 1993; pp. 489-491; Prentice Hall, Inc., A Paramount Communications Company; Englewood Cliffs, New Jersey.

PCT International Search Report; International App. No. PCT/US07/02298; Jan. 16, 2009; pp. 1-3.

PCT International Search Report; International App. No. PCT/US2007/001905; Jan. 16, 2009; pp. 1-2.

* cited by examiner

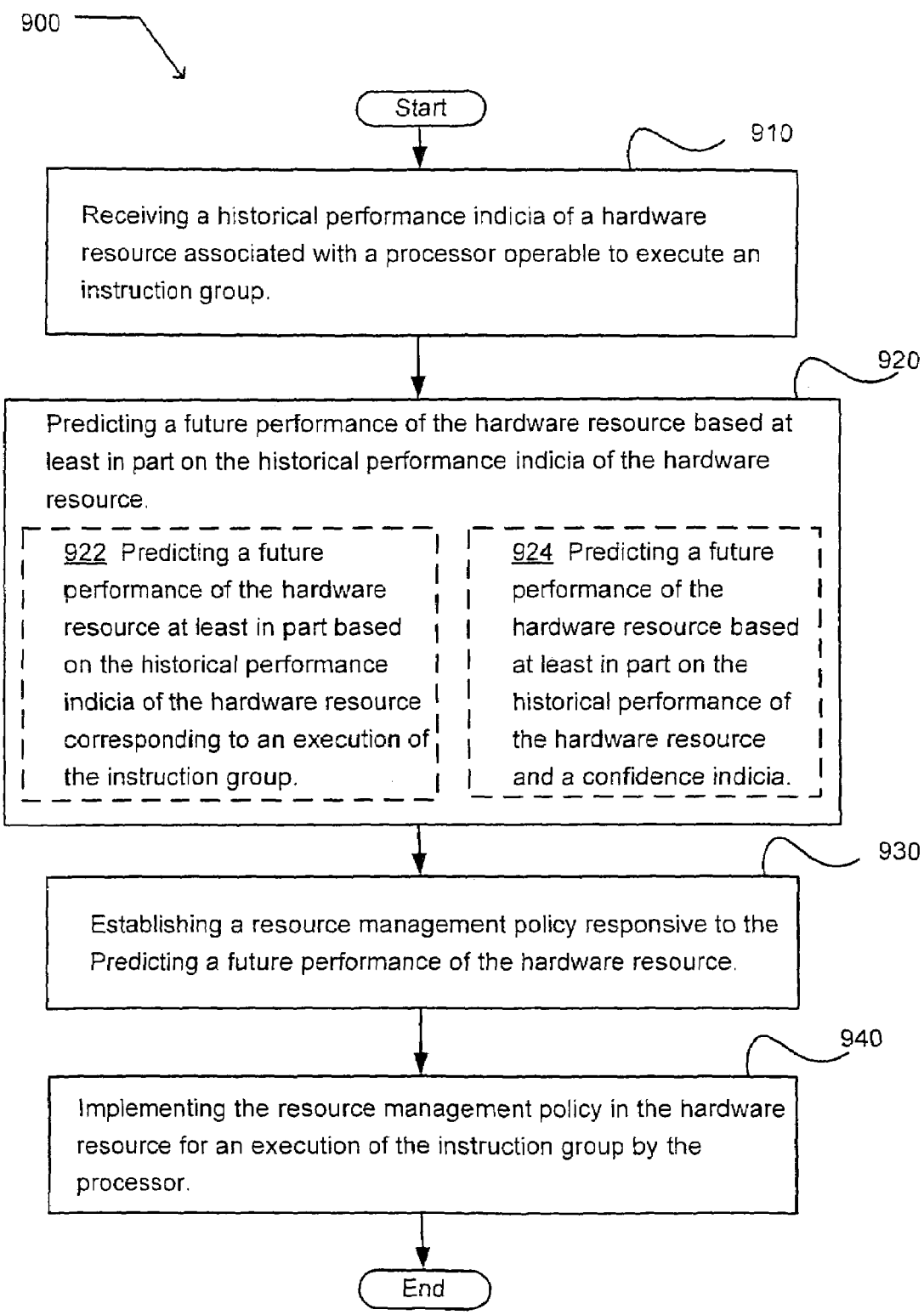

INSTRUCTION-ASSOCIATED PROCESSOR RESOURCE OPTIMIZATION

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith. The United States Patent Office (USPTO) has published a notice to the effect that the USPTO's computer programs require that patent applicants reference both a serial number and indicate whether an application is a continuation or continuation in part. Stephen G. Kunin, *Benefit of Prior-Filed Application*, USPTO Electronic Official Gazette, Mar. 18, 2003 at http)://www.uspto.gov/web/offices/com/sol/og/2003/week11/patbene.htm. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part."Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

RELATED APPLICATIONS

1. For purposes of the USPTO extra-statutory requirements, the present application constitutes a continuation-in-part of U.S. patent application entitled PROCESSOR RESOURCE MANAGEMENT, naming Bran Ferren; W. Daniel Hillis; Nathan P. Myhrvold; Clarence T. Tegreene; and Lowell L. Wood, Jr. as inventors, U.S. application Ser. No. 11/214,449, filed Aug. 29, 2005.
2. For purposes of the USPTO extra-statutory requirements, the present application constitutes a continuation-in-part of U.S. patent application entitled PREDICTIVE PROCESSOR RESOURCE MANAGEMENT, naming Bran Ferren; W. Daniel Hillis; William Mangione-Smith; Nathan P. Myhrvold; Clarence T. Tegreene; and Lowell L. Wood, Jr. as inventors, U.S. application Ser. No. 11/214,459, filed Aug. 29, 2005.
3. For purposes of the USPTO extra-statutory requirements, the present application constitutes a continuation-in-part of United States Patent application entitled MULTIPROCESSOR RESOURCE OPTIMIZATION, naming Bran Ferren; W . Daniel Hillis; Nathan P. Myhrvold; Clarence T. Tegreene; and Lowell L. Wood, Jr. as inventors, U.S. application Ser. No. 11/214,458, filed Aug. 29, 2005.

BRIEF DESCRIPTION OF THE DRAWINGS

FIG. 19 illustrates alternative embodiments of the operation 920 of FIG. 18.

DETAILED DESCRIPTION

In the following detailed description of exemplary embodiments, reference is made to the accompanying drawings, which form a part hereof. In the several figures, like referenced numerals identify like elements. The detailed description and the drawings illustrate exemplary embodiments. Other embodiments may be utilized, and other changes may be made, without departing from the spirit or scope of the subject matter presented here. The following detailed description is therefore not to be taken in a limiting sense, and the scope of the claimed subject matter is defined by the appended claims.

Figure 1:
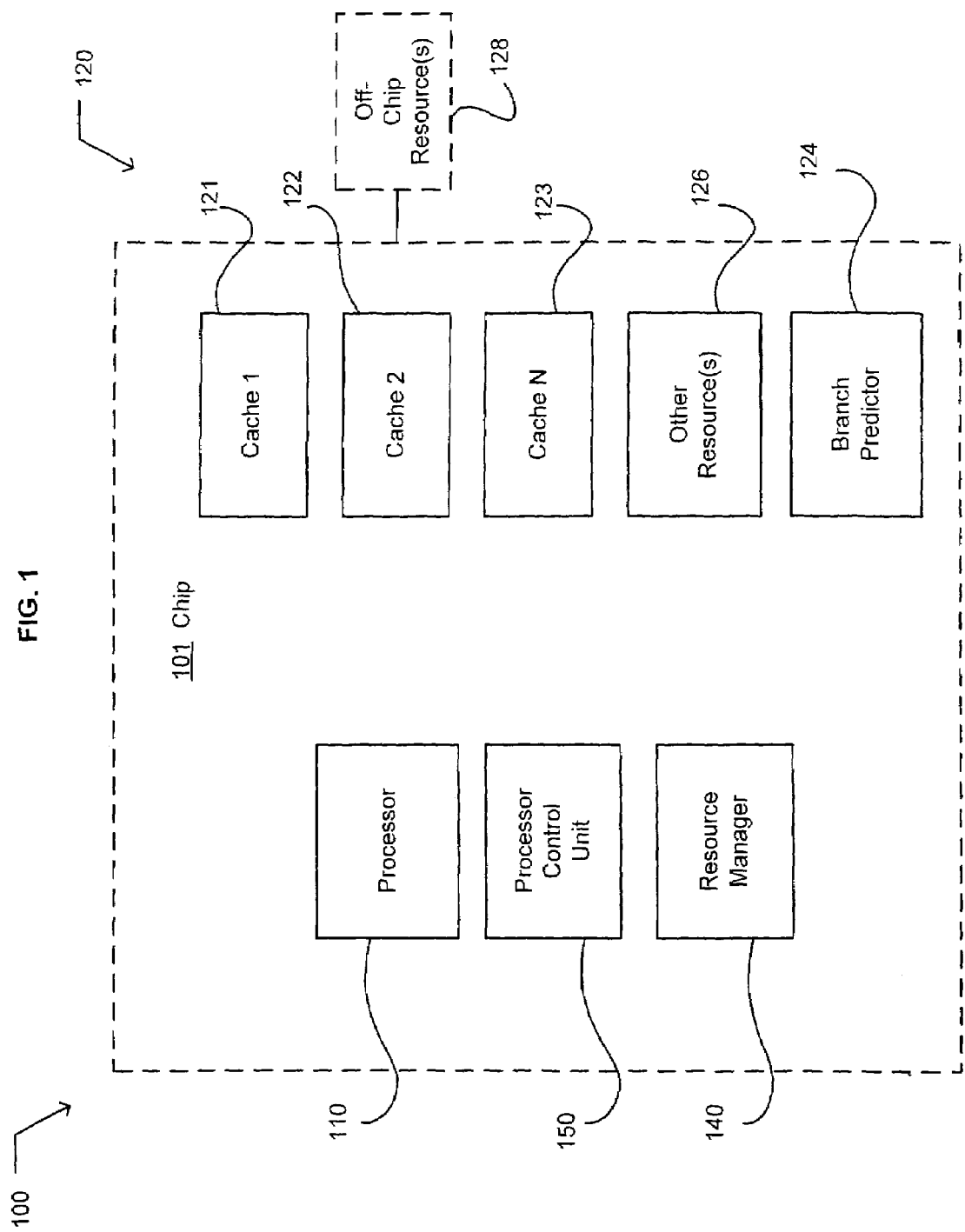
FIG. 1 illustrates a partial view of an exemplary device in which embodiments may be implemented.

FIG. 1 illustrates a partial view of an exemplary device 100 in which embodiments may be implemented. The device includes a processor 110 and a hardware resource 120 associated with the processor. The hardware resource may be any hardware resource associated and/or associatable with a processor. In an embodiment, the hardware resource may include one or more caches, illustrated as a cache 1 (121), a cache 2 (122), and through a cache N (123). Also, the hardware resource may include a branch predictor 124.

In another embodiment, the hardware resource 120 may include any other resource associated with the processor, illustrated as other resource 126. In a further embodiment, the hardware resource includes an off-chip resource, illustrated as an off-chip resource 128. For example, the cache 1 (121) may be an on-chip L1 cache and the cache 2 (122) may be an on-chip L2 cache. By way of further example, the off-chip resource 128 may be an off-chip L2 cache.

The device also includes a resource manager 140, and/or a processor control unit 150. The processor control unit 150 may be an element of the processor 110, or may be an element separate from the processor. In an embodiment, the processor, the processor control unit, and at least one of the hardware devices are formed in a single chip, illustrated as the processor chip 101. In another embodiment, the processor is formed in a first chip and at least one of the hardware resources formed in a second chip.

The resource manager 140 includes an operability to compare an execution of an instruction group pursuant to a first resource management policy applied to the hardware resource and an execution of the instruction group pursuant to a second resource management policy applied to the hardware resource. The resource manager also includes an operability to select from the first resource management policy and the second resource management policy a resource management policy likely to provide a substantially optimum execution of the instruction group. The resource manager further includes an operability to associate the selected resource management policy with the instruction group.

In an embodiment, an "instruction group" may include a functional instruction, a branching instruction, a memory instruction, and/or other instruction that may be executed by a processor. In another embodiment, an instruction group includes a statement or a portion of a statement in a program. In a further embodiment, an instruction group includes at least two statements from a program. A program may include any type of a program, from several lines of instructions, to an application, and to an operating system. In an embodiment, an instruction group may include a decoded instruction, a translated instruction, and/or a micro-operation (a portion of a translated instruction).

In an embodiment, the hardware resource includes a hardware resource logically associated with the processor. In another embodiment, the hardware resource includes a hardware resource physically associated with the processor. In a further embodiment, the hardware resource includes a hardware resource managed by the processor. In an embodiment, the hardware resource managed by the processor includes at least one of a memory, a cache, a bus, a register-file port, and a functional unit.

In an embodiment, the resource manager operable to compare includes a resource manager operable to compare according to preselected criterion. The preselected criterion includes at least one of a successful completion of the instruction group, an unsuccessful completion of the instruction group, an uncertain completion of the instruction group, an exception, a time to execute the instruction group, a successful hit, an unsuccessful hit, a hit ratio, correctly predicting a branch taken, incorrectly predicting a branch taken, correctly predicting a branch not taken, and/or incorrectly predicting a branch not taken.

In another embodiment, the resource manager operable to select from the first resource management policy and the second resource management policy a resource management policy likely to provide a substantially optimum execution of the instruction group includes resource manager operable to select a management policy likely to provide a substantially optimum execution of the instruction group according to a preselected criterion. In an embodiment, the preselected criterion includes a criterion responsive to an output of the compare an execution of an instruction group pursuant to a first resource management policy applied to the hardware resource and an execution of the instruction group pursuant to a second resource management policy applied to the hardware resource. In a further embodiment, the preselected criterion includes a criterion responsive to at least one of a successful completion of the instruction group, an unsuccessful completion of the instruction group, an uncertain completion of the instruction group, an exception, a time to execute the instruction group, a successful hit, an unsuccessful hit, a hit ratio, correctly predicting a branch taken, incorrectly predicting a branch taken, correctly predicting a branch not taken, and/or incorrectly predicting a branch not taken.

In an embodiment, the resource manager operable to select from the first resource management policy and the second resource management policy a management policy likely to provide a substantially optimum execution of the instruction group includes a resource manager operable to compare the execution of the instruction group pursuant to the first management policy and the execution of the instruction group pursuant to the second management policy applied to the resource.

In another embodiment, the first resource management policy includes an optimistic management policy. In a further embodiment, the optimistic resource management policy includes an optimistic resource management policy that assumes that the instruction group will execute in a substantially optimal manner. In an embodiment, the optimistic resource management policy assumes that the instruction group will execute in a substantially optimal manner includes an optimistic resource management policy that assumes that less than a preselected level of at least one error will occur during execution of the instruction group. In a further embodiment, the at least one error includes an occurrence of at least one of a hardware error, a fetch error, a memory error, a cache miss, a software error, an arithmetic overflow, a stale datum, a branch prediction error, an attempt to access forbidden memory, and/or an inability of an operating system to grant a request.

In an embodiment, the second resource management policy includes a pessimistic resource management policy. In another embodiment, the pessimistic resource management policy includes a pessimistic resource management policy that assumes that the instruction group will execute in a substantially sub-optimal manner. In a further embodiment, the pessimistic resource management policy assumes that the instruction group will execute in a substantially sub-optimal manner includes a pessimistic resource management policy that assumes that greater than a preselected level of at least one error will occur during execution of the instruction group. In an embodiment, the at least one error includes at least one of a hardware error, a fetch error, a memory error, a cache miss, a software error, an arithmetic overflow, a stale datum, a branch prediction error, an attempt to access forbidden memory, and/or an inability of an operating system to grant a request.

In another embodiment, the resource manager operable to select a management policy likely to provide a substantially optimum execution of the instruction group includes a resource manager operable to select a management policy likely to provide a substantially optimum execution of the instruction group according to a preselected criterion. In a further embodiment, the preselected criterion includes at least one of a successful completion of the instruction group, an unsuccessful completion of the instruction group, an uncertain completion of the instruction group, an exception, a time to execute the instruction group, a successful hit, an unsuccessful hit, a hit ratio, correctly predicting a branch taken, incorrectly predicting a branch taken, correctly predicting a branch not taken, and/or incorrectly predicting a branch not taken.

In a further embodiment, the resource manager operable to select a management policy likely to provide a substantially optimum execution of the instruction group includes a resource manager operable to select a management policy predicted as likely to provide a substantially optimum execution of the instruction group. In an embodiment, the resource manager operable to select a management policy likely to provide a substantially optimum execution of the instruction group includes a resource manager operable to select a management policy predicted by a Bayesian method as likely provide a substantially optimum execution of the instruction group. In another embodiment, the resource manager operable to select a management policy predicted by a Bayesian method as likely provide a substantially optimum execution of the instruction group includes resource manager operable to recall historical data from a ghost page. In a further embodiment, the resource manager operable to select a management policy likely to provide a substantially optimum execution of the instruction group includes a resource manager operable to select a management policy predicted by a heuristic as likely provide a substantially optimum execution of the instruction group. In an embodiment, the resource manager operable to select a management policy likely to provide a substantially optimum execution of the instruction group includes a resource manager operable to select a management policy predicted by a learning algorithm as likely provide a substantially optimum execution of the instruction group. In another embodiment, the associate the selected resource management policy with the instruction group includes associate a ghost page indicative of the selected resource management policy with the instruction group.

In an embodiment, a Bayesian method includes any methodology corresponding to or derived from Bayesian theories. In another embodiment, a Bayesian method includes but is not limited to statistics, principles, models, applications, analysis, decisions, inferences, probabilistic modeling, probabilistic reasoning, networks, and/or approaches based at least in part on the work of Thomas Bayes.

In operation, an embodiment provides an optimized configuration of the actual hardware resource 120 and the actual processor 110 when the processor is executing an instruction group. For example, the hardware resource may include an L2 cache. The instruction group is executed by the processor in two passes, a first pass includes application of the first resource management policy to the L2 cache, and a second pass includes application of the second resource management policy to the L2 cache. The execution results are then compared. For example, a comparison may include parameters of execution time and cache misses. One of the two resource management policies is then selected as likely to provide a better execution of the instruction group. The selected resource management policy is then associated with the instruction group in a manner allowing retrieval. The selected resource management policy may be saved in a manner allowing retrieval for a future application to the cache when the processor is scheduled to run the instruction group. For example, the selected resource management policy may be saved in a ghost page associated with at least a portion of the instruction group.

In another embodiment of an operation, the resource may include a dynamic branch predictor, such as the branch predictor 124. As described above, the instruction group is executed by the processor in two passes, a first pass includes application of the first resource management policy to the branch predictor, and a second pass includes application of the second resource management policy to the branch predictor. The execution results are then compared. For example, a comparison may include branching operations correctly predicted. One of the two resource management policies for branch prediction is then selected as likely to provide a better execution of the instruction group. The selected resource management policy is then associated with the instruction group in a manner allowing retrieval. The selected resource management policy may be saved in a manner allowing retrieval for a future application to the branch predictor when the processor is scheduled to run the instruction group.

Figure 2:
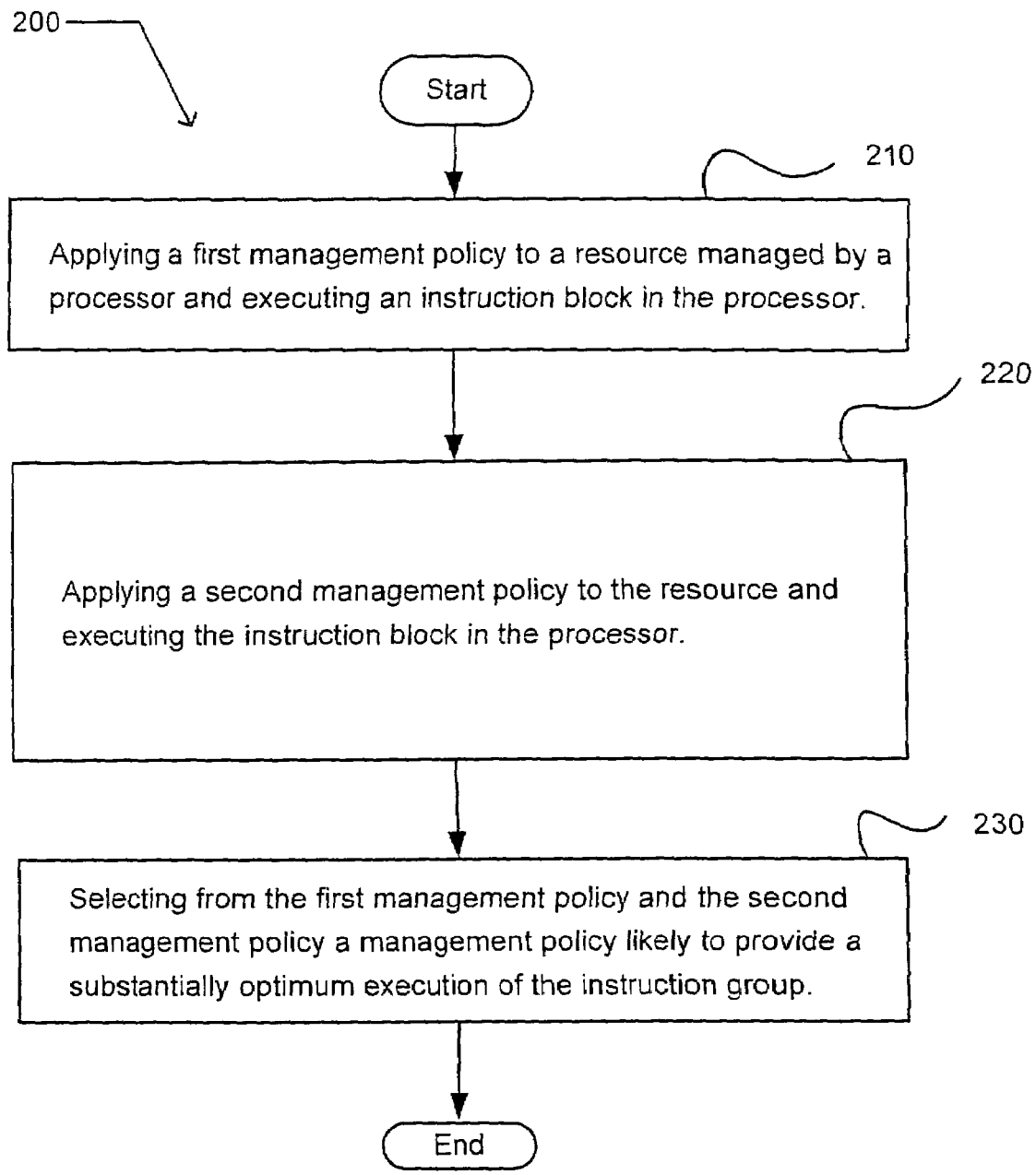
FIG. 2 illustrates an exemplary operational flow in which embodiments may be implemented.

FIG. 2 illustrates an exemplary operational flow 200 in which embodiments may be implemented. In an embodiment, the operational flow may be executed in the device 100 of FIG. 1. An operation 210 applies a first management policy to a resource managed by a processor and executing an instruction block in the processor. An operation 220 applies a second management policy to the resource and executing the instruction block in the processor. An operation 230 selects a management policy likely to provide a substantially optimum execution of the instruction group from the first management policy and the second management policy.

Figure 3:
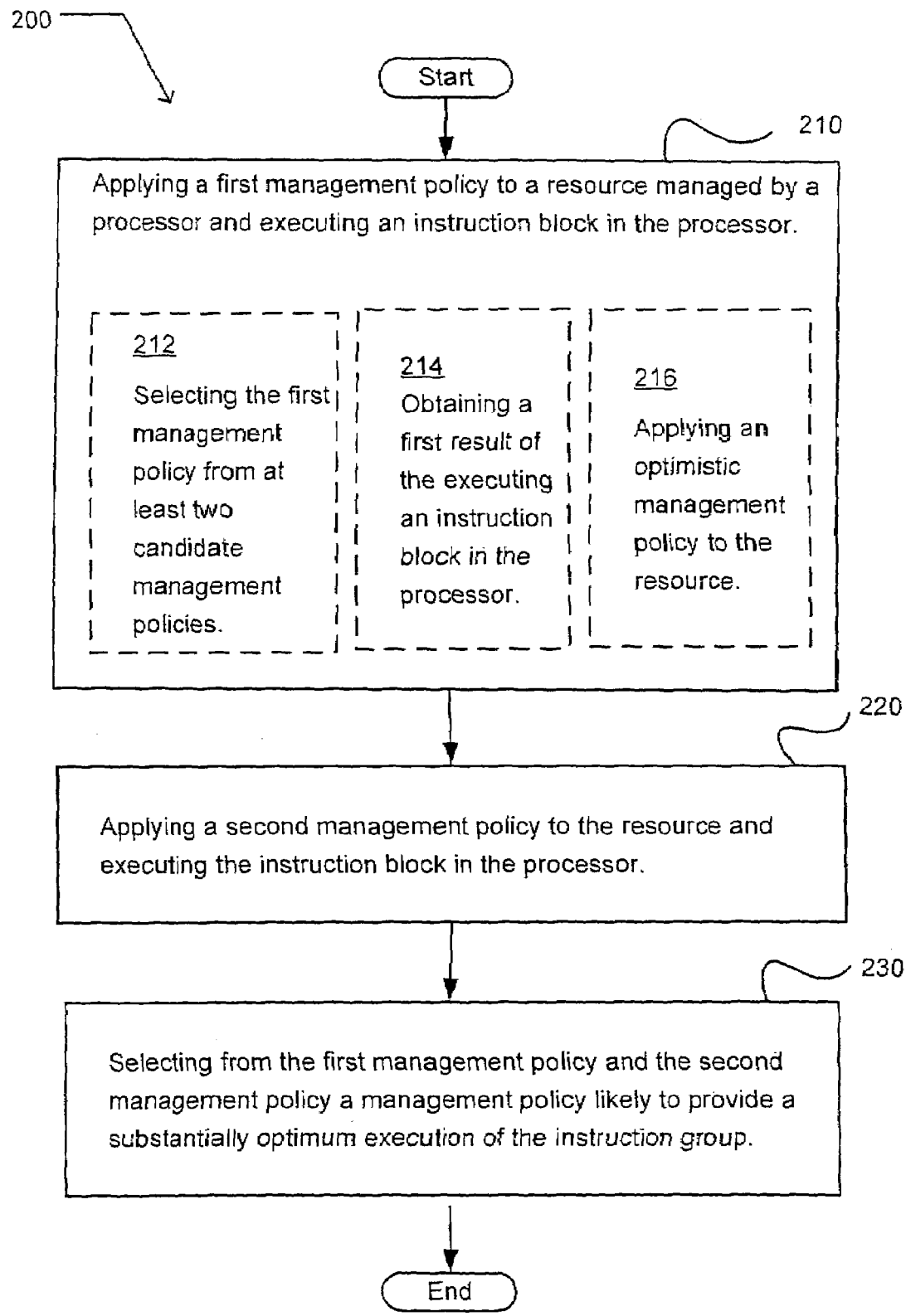
FIG. 3 illustrates alternative embodiments of the operation 210 of FIG. 2.

FIG. 3 illustrates alternative embodiments of the operation 210 of FIG. 2. The operation 212 selects the first management policy from at least two candidate management policies. The operation 214 obtains a first result of the executing an instruction block in the processor. The operation 216 applies an optimistic management policy to the resource. The applying an optimistic management policy to the resource may include applying a resource management policy that assumes that less than a preselected level of at least one error will occur during an execution of the instruction group.

Figure 4:
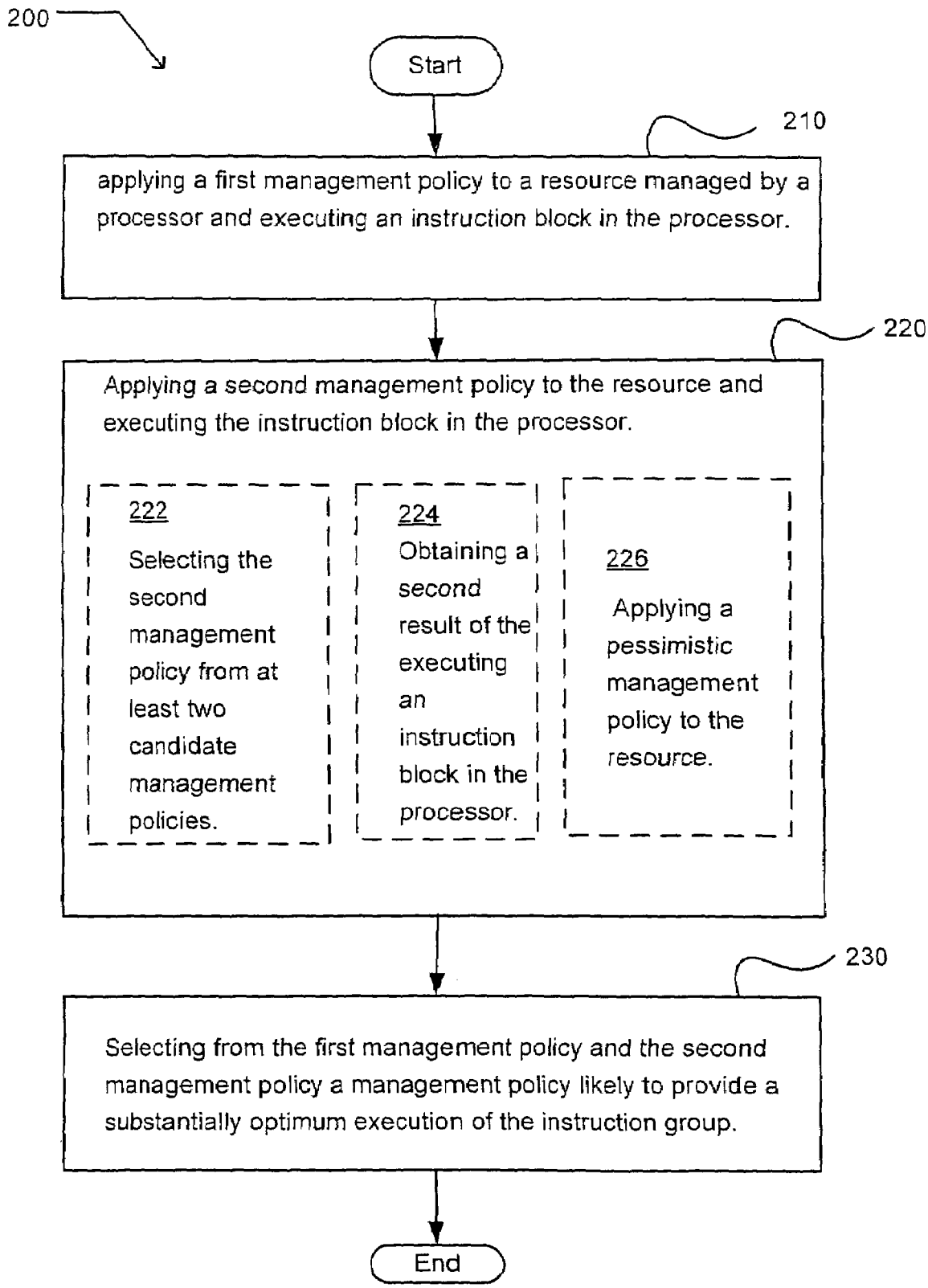
FIG. 4 illustrates alternative embodiments of the operation 220 of FIG. 2.

FIG. 4 illustrates alternative embodiments of the operation 220 of FIG. 2. The operation 222 selects the second management policy from at least two candidate management policies. The operation 224 obtains a second result of the executing an instruction block in the processor. The operation 226 applies a pessimistic management policy to the resource. The applying a pessimistic management policy to the resource may include applying a management policy that assumes that more than a preselected level of at least one error will occur during an execution of the instruction group.

Figure 5:
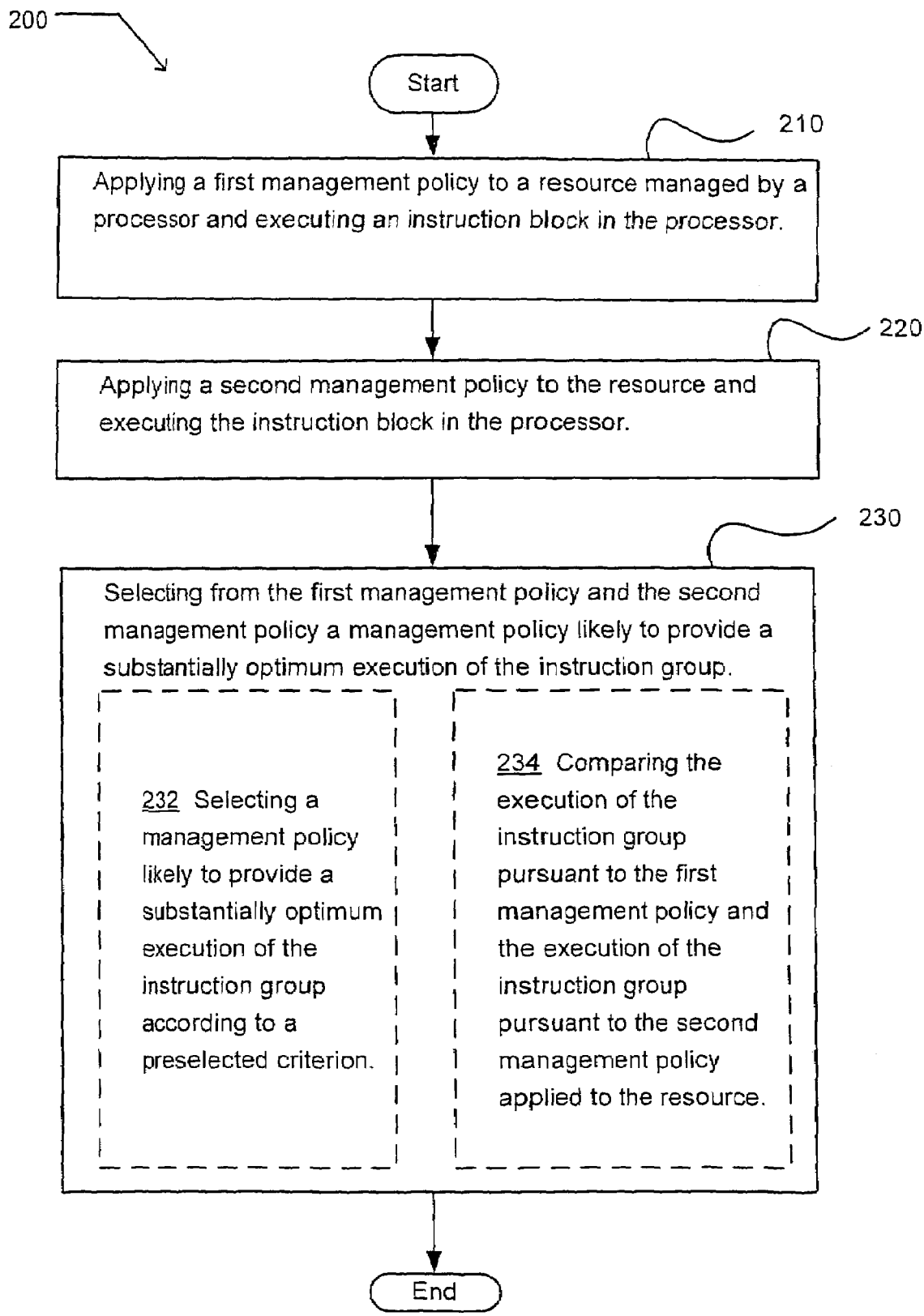
FIG. 5 illustrates alternative embodiments of the operation 230 of FIG. 2.

FIG. 5 illustrates alternative embodiments of the operation 230 of FIG. 2. The operation 232 selects a management policy likely to provide a substantially optimum execution of the instruction group according to a preselected criterion. The operation 234 compares the execution of the instruction group pursuant to the first management policy and the execution of the instruction group pursuant to the second management policy applied to the resource.

Figure 6:
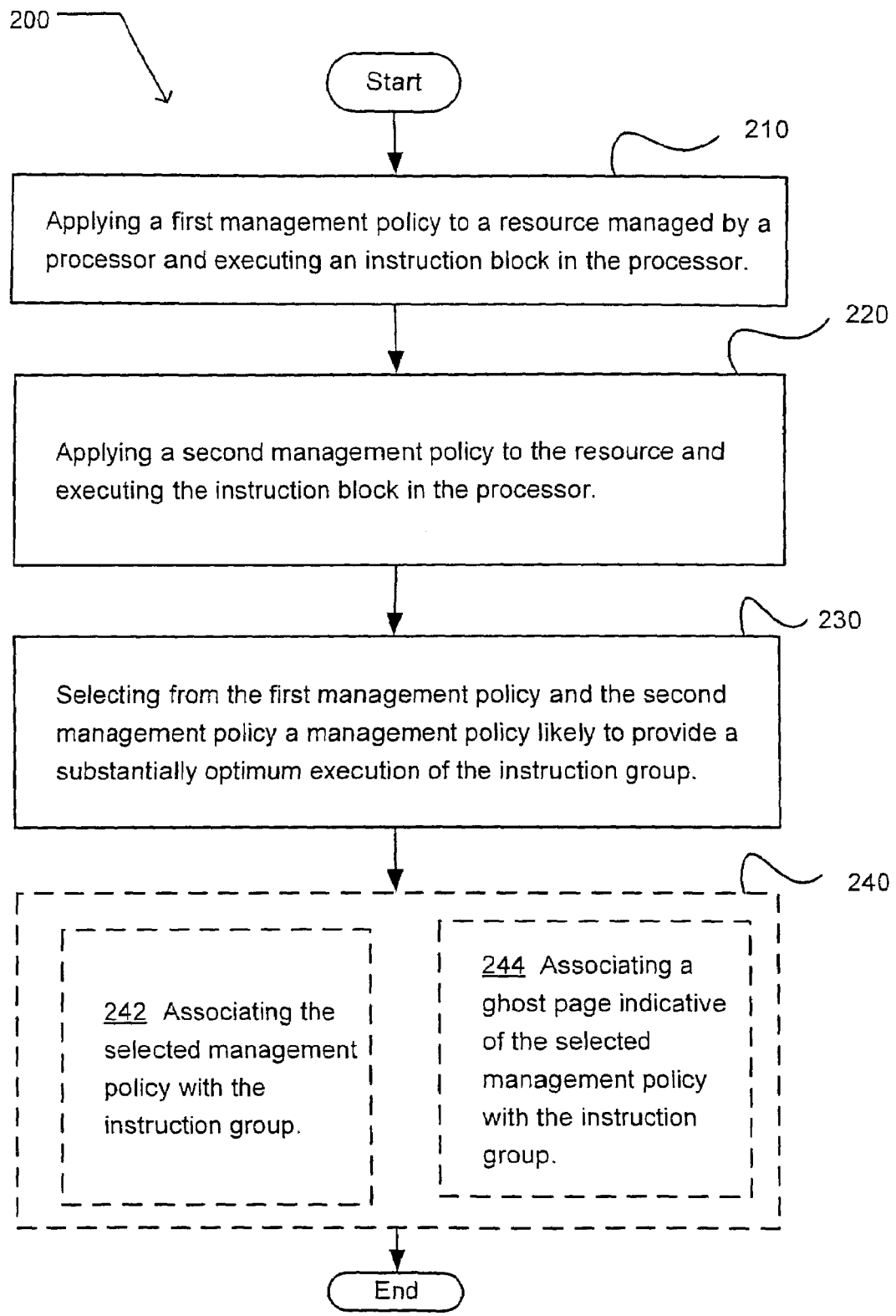
FIG. 6 illustrates alternative embodiments of the operational flow of FIG. 2.

FIG. 6 illustrates alternative embodiments of the operational flow 200 of FIG. 2. The operational flow 242 associates the selected management policy with the instruction group. The operational flow 244 associates a ghost page indicative of the selected management policy with the instruction group.

In an alternative embodiment, the exemplary operational flow 200 may include an iterative method where the operational flow 200 is repeated at least twice to test at least three resource management policies, and allow a selecting from the at least three resource management policies.

Returning to FIG. 1, an alternative embodiment of the exemplary device 100 includes the processor 110 having the hardware resource 120 associated with the processor. In the alternative embodiment, the processor control unit 150 includes a processor control unit operable to compare an execution of an instruction group pursuant to an optimistic resource management policy applied to the hardware resource and an execution of the instruction group pursuant to a pessimistic resource management policy applied to the hardware resource. The alternative embodiment of the processor control unit also includes a processor control unit operable to select from the optimistic resource management policy and the pessimistic resource management policy a resource management policy likely to provide a substantially optimum execution of the instruction group. The alternative embodiment of the processor control unit further includes a resource manager operable to associate the selected resource management policy with the instruction group. In an embodiment, the processor and the processor control unit are formed on a single chip.

In a further embodiment, the optimistic resource management policy assumes that the instruction group will execute in a substantially optimal manner. In another embodiment, the optimistic resource management policy assumes that the instruction group will execute in a substantially optimal manner includes an optimistic resource management policy that assumes that less than a preselected level of at least one error will occur during execution of the instruction group. In an embodiment, the at least one error includes an occurrence of at least one of a hardware error, a fetch error, a memory error, a cache miss, a software error, an arithmetic overflow, a stale datum, a branch prediction error, an attempt to access forbidden memory, and/or an inability of an operating system to grant a request.

In an embodiment, the pessimistic resource management policy assumes that the instruction group will execute in a substantially sub-optimal manner. In another embodiment, the pessimistic resource management policy assumes that the instruction group will execute in a substantially sub-optimal manner includes a pessimistic resource management policy that assumes that greater than a preselected level of at least one error will occur during execution of the instruction group. In a further embodiment, the at least one error includes at least one of a hardware error, a fetch error, a memory error, a cache miss, a software error, an arithmetic overflow, a stale datum, a branch prediction error, an attempt to access forbidden memory, and/or an inability of an operating system to grant a request.

Figure 7:
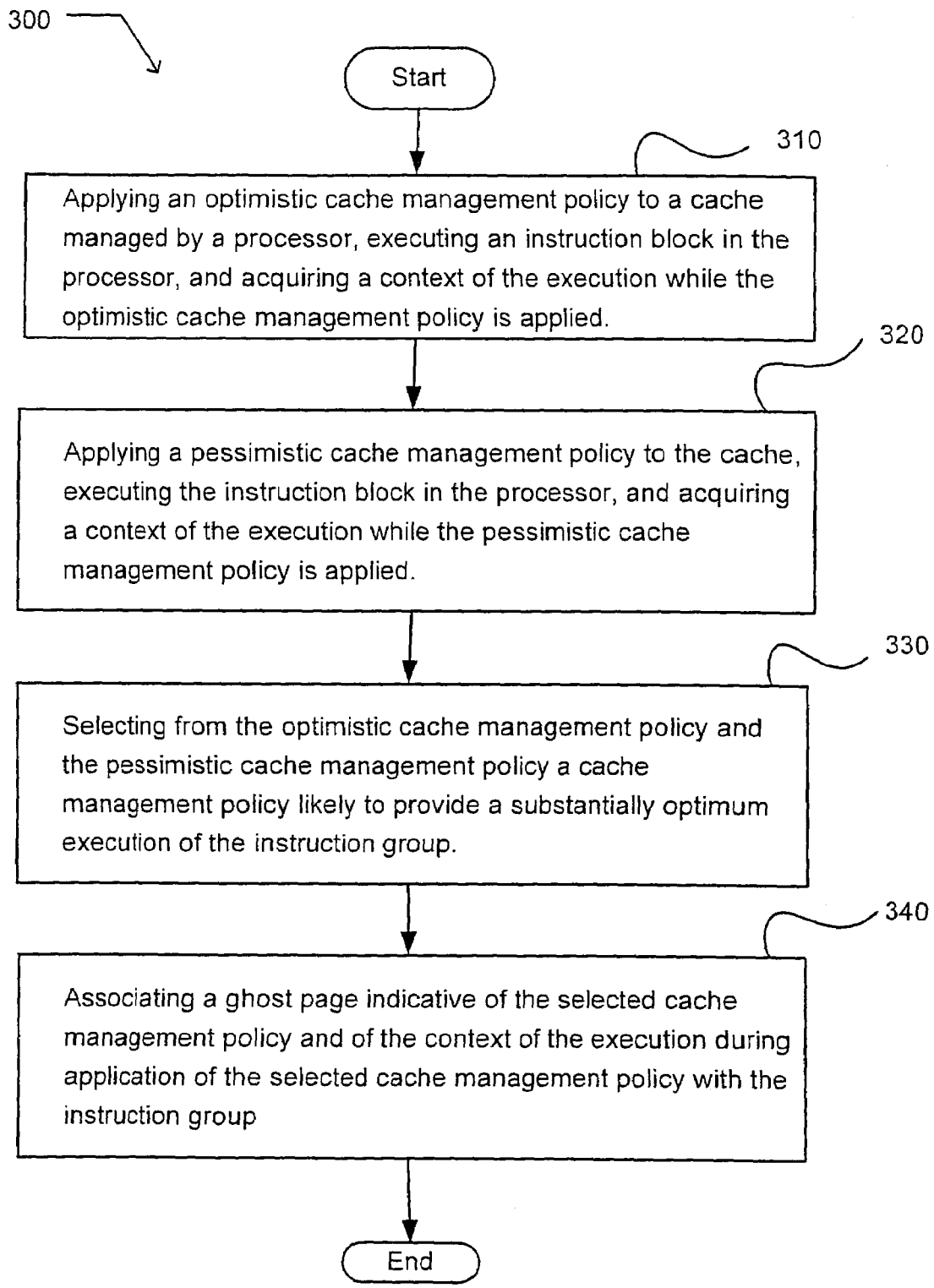
FIG. 7 illustrates an exemplary operational flow in which embodiments may be implemented.

FIG. 7 illustrates an exemplary operational flow 300 in which embodiments may be implemented. The operation 310 applies an optimistic cache management policy to a cache managed by a processor, executing an instruction block in the processor, and acquiring a context of the execution while the optimistic cache management policy is applied. The operation 320 applies a pessimistic cache management policy to the cache, executing the instruction block in the processor, and acquiring a context of the execution while the pessimistic cache management policy is applied. The operation 330 selects a cache management policy likely to provide a substantially optimum execution of the instruction group from the optimistic cache management policy and the pessimistic cache management policy. The operation 340 associates a ghost page indicative of the selected cache management policy and of the context of the execution during application of the selected cache management policy with the instruction group.

Further returning to FIG. 1, another alternative embodiment of the exemplary device 100 includes the processor 110 having the hardware resource 120 associated with the processor. In the alternative embodiment, the processor control unit 150 includes a processor control unit operable to fetch an instruction to be executed in the processor. In an embodiment, the operation to fetch the instruction to be executed in the processor may include facilitating the operation to fetch the instruction to be executed in the processor. In another embodiment, the operation to fetch the instruction to be executed in the processor may include issuing a signal timing the operation to fetch the instruction to be executed in the processor. The processor control unit is also operable to receive a previously selected resource management policy associated with the instruction, the resource management policy having been selected as likely to provide a substantially optimum execution of an instruction group that includes the instruction, and having been selected from a optimistic resource management policy and a pessimistic resource management policy. The processor control unit is further operable to apply the previously selected resource management policy to the resource. In another alternative embodiment, the processor control unit is also operable to enable the processor to execute the instruction. In a further alternative embodiment, the processor control unit is operable to enable the processor to execute the instruction, and apply another resource management policy to the hardware resource.

In operation, an embodiment obtains a previously selected optimized configuration of the hardware resource 120 for the processor 110 in conjunction with executing the instruction group. When the processor is preparing to execute an instruction group, the processor control unit receives a previously selected resource management policy associated with the instruction. In an embodiment, the previously selected resource management policy may include a previously selected resource management policy provided by the method 200 of FIG. 2 and/or the method 300 of FIG. 7. For example, the hardware resource may include the branch predictor 124, and the previously selected resource management policy may include a previously selected resource management policy selected as likely to provide a substantially optimum execution of the instruction. The processor control unit applies the previously selected resource management policy to the hardware resource, such as the branch predictor. The instruction is executed by the processor with the hardware resource, such as the branch predictor, managed by the previously selected resource management policy. This is expected to provide an optimized execution of the instruction over an execution of the instruction with a resource management policy applied to the hardware resource that is not likely to provide a substantially optimum execution of the instruction group.

Figure 8:
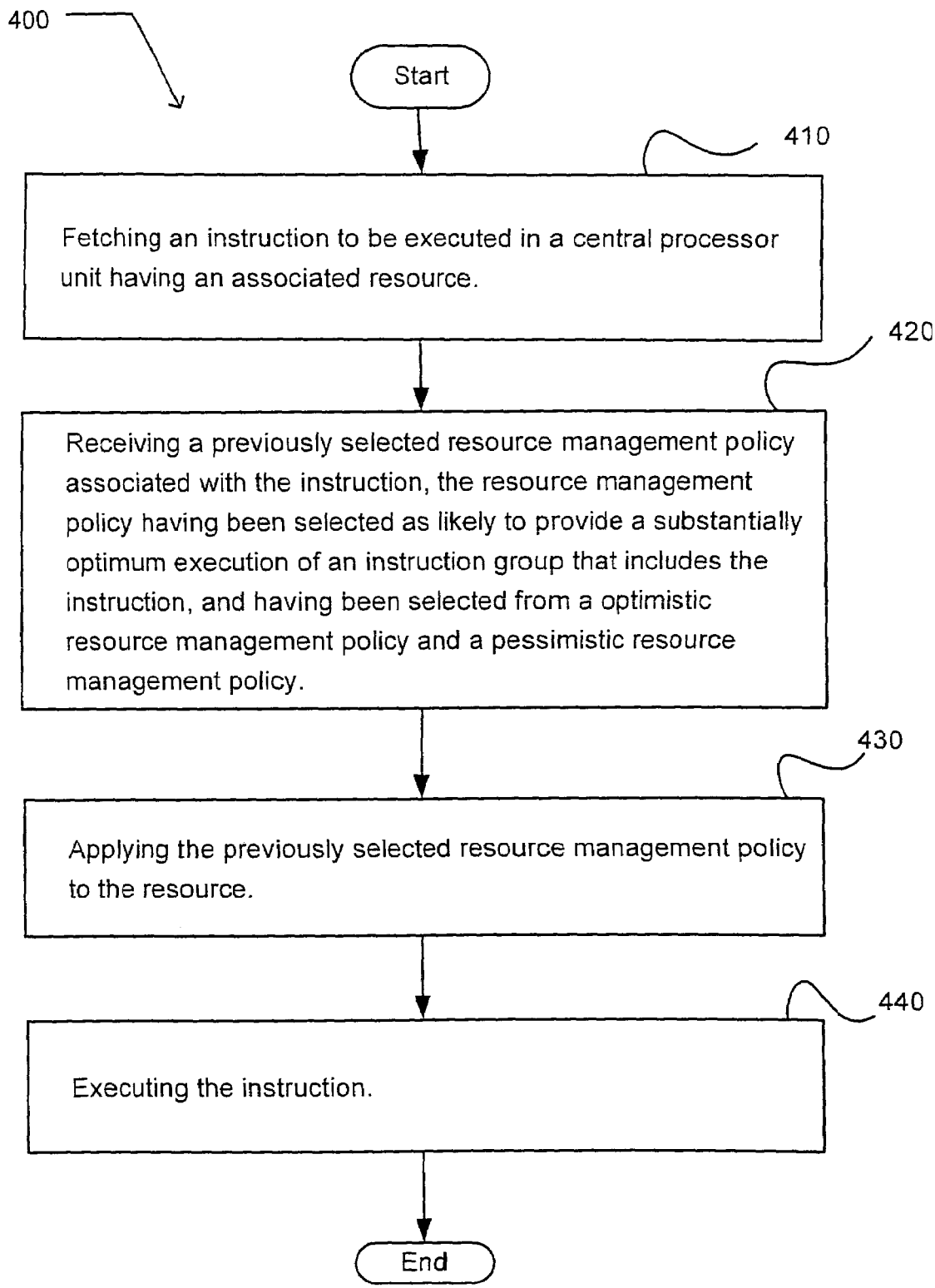
FIG. 8 illustrates an exemplary operational flow in which embodiments may be implemented.

FIG. 8 illustrates an exemplary operational flow 400 in which embodiments may be implemented. An operation 410 fetches an instruction to be executed in a central processor unit having an associated resource. An operation 420 receives a previously selected resource management policy associated with the instruction. The resource management policy having been selected as likely to provide a substantially optimum execution of an instruction group that includes the instruction, and having been selected from a optimistic resource management policy and a pessimistic resource management policy. An operation 430 applies the previously selected resource management policy to the resource. An operation 440 executes the instruction in the central processor unit. In a further alternative embodiment, an operation (not shown) executes the instruction in the central processor unit and then applies another resource management policy to the hardware resource.

Figure 9:
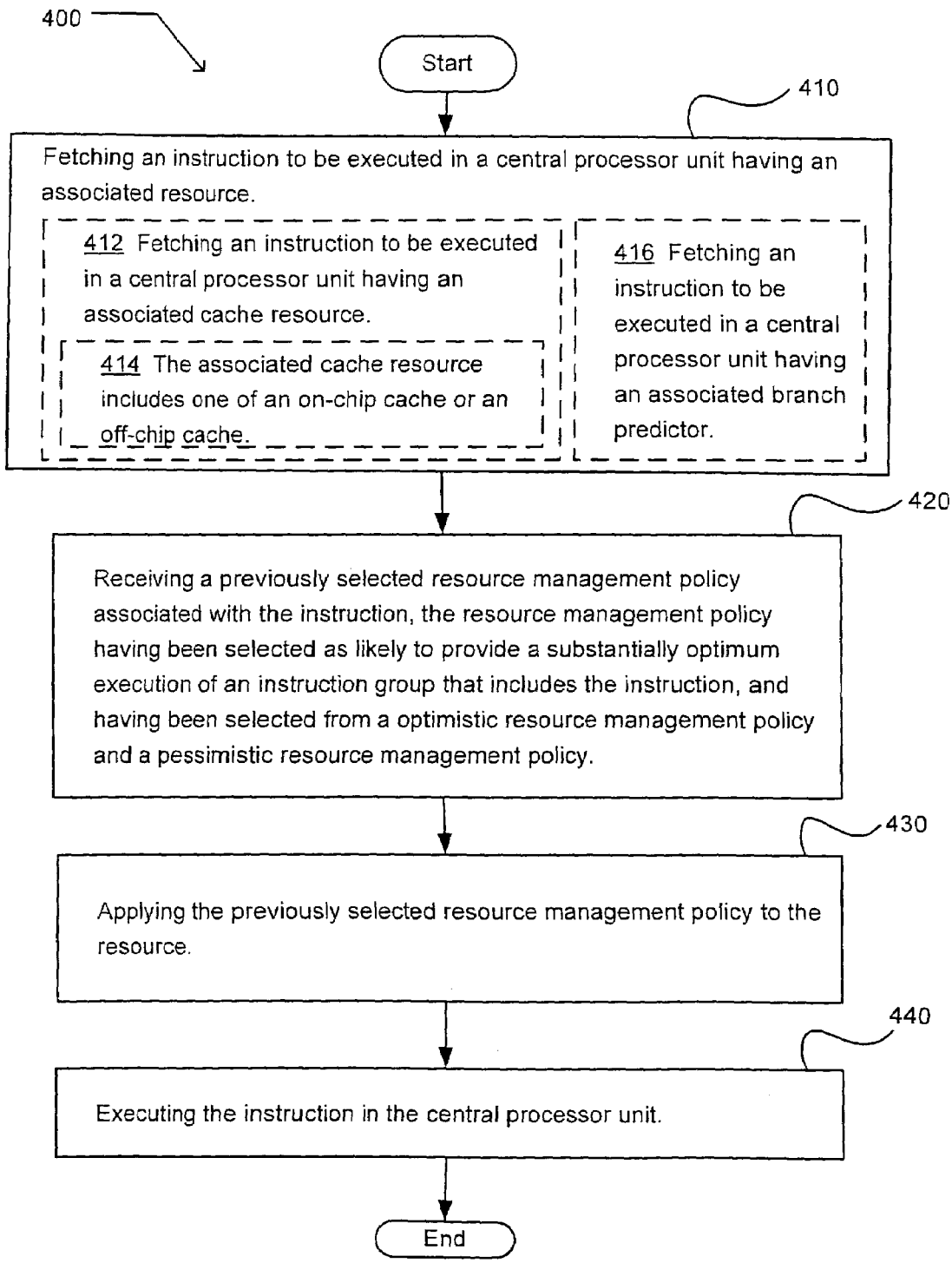
FIG. 9 illustrates alternative embodiments of the operation of FIG. 8.

FIG. 9 illustrates alternative embodiments of the operation 410 of FIG. 8. An operation 412 fetches an instruction to be executed in a central processor unit having an associated cache resource. An operation 416 fetches an instruction to be executed in a central processor unit having an associated branch predictor resource. In an alternative embodiment of the operation 410, at an operation 414, the associated cache resource includes one of an on-chip cache or an off-chip cache.

Figure 10:
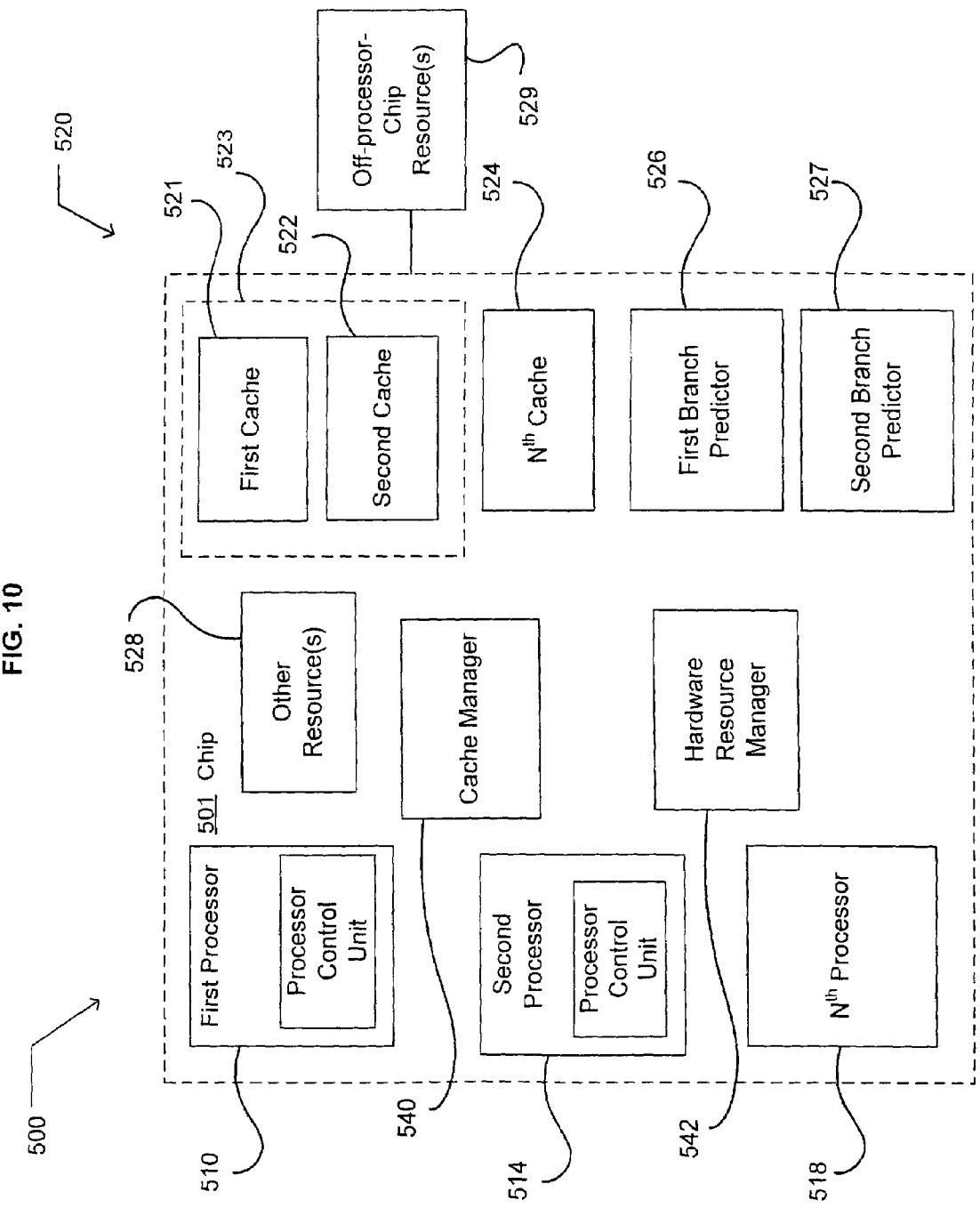
FIG. 10 illustrates an exemplary embodiment of a device in which embodiments may be implemented.

FIG. 10 illustrates an exemplary embodiment of a device 500 in which embodiments may be implemented. The device includes a first processor 510, a second processor 514, and a $N^{th}$ Processor 518. The device also includes at least one hardware resource 220 associated with the processor. The at least one hardware resource may be any hardware resource associated and/or associatable with a processor. In an embodiment, the at least one hardware resource includes a first cache 521 associated with the first processor and a second cache 522 associated with the second processor. In another embodiment, the at least one hardware resource may include an $N^{th}$ cache 524, a first branch predictor 526, an second branch predictor 527, other resource(s) 528, and an off-processor-chip resource 529. The device also includes a cache manager 540 operable to manage the caches 521, 522, and 524, and a hardware resource manager operable to manage other hardware, such as the branch predictor, the other resource(s), and the off-processor-chip resource(s).

The device 500 also includes a cache manager 540 implemented in a hardware-logic. The cache manager is operable to compare an execution of an instruction group by the first processor 510 while a first cache management policy is applied to the first cache 521 and an execution of the instruction group by the second processor 514 while a second cache management policy is applied to the second cache 522. The cache manager is also operable to select a cache management policy likely to provide a substantially optimum execution of the instruction group from the first cache management policy and the second cache management policy. The cache manager is further operable to associate the selected cache management policy with the instruction group.

In an embodiment, the first processor 510 and the second processor 514 are implemented on a single chip. In another embodiment the first cache 521 and the second cache 522 are a logical partition of a physical memory 523. In a further embodiment, the first cache and second cache are accessible by both the first and second processor. In an embodiment, the first cache includes an L2 cache and the second cache includes an L2 cache. In another embodiment, the first processor and the cache manager are-formed on a single chip 501.

In an embodiment, the cache manager operable to associate the selected cache management policy with the instruction group includes a cache manager operable to associate a ghost page indicative of the selected management policy with the instruction group. In a further embodiment, the cache manager operable to compare includes a cache manager operable to compare according to preselected criterion. In an embodiment, the preselected criterion includes at least one of a successful completion of the instruction group, an unsuccessful completion of the instruction group, an uncertain completion of the instruction group, an exception, a time to execute the instruction group, a successful hit, an unsuccessful hit, a hit ratio, correctly predicting a branch taken, incorrectly predicting a branch taken, correctly predicting a branch not taken, and/or incorrectly predicting a branch not taken.

In an embodiment, the first cache management policy assumes that the instruction group will execute in a substantially optimal manner. In another embodiment, the first cache management policy that assumes that the instruction group will execute in a substantially optimal manner includes a first cache management policy that assumes that less than a preselected level of at least one error will occur during execution of the instruction group. In a further embodiment, the at least one error includes an occurrence of at least one of a hardware error, a fetch error, a memory error, a cache miss, a software error, an arithmetic overflow, a stale datum, a branch prediction error, an attempt to access forbidden memory, and/or an inability of an operating system to grant a request.

In an embodiment, the second cache management policy assumes that the instruction group will execute in a substantially sub-optimal manner. In another embodiment, the second cache management policy assumes that the instruction group will execute in a substantially sub-optimal manner includes a second cache management policy that assumes that greater than a preselected level of at least one error will occur during execution of the instruction group. In a further embodiment, the at least one error includes at least one of a hardware error, a fetch error, a memory error, a cache miss, a software error, an arithmetic overflow, a stale datum, a branch prediction error, an attempt to access forbidden memory, and/or an inability of an operating system to grant a request.

In an embodiment, the cache manager operable to select a management policy likely to provide a substantially optimum execution of the instruction group includes a cache manager operable to select a management policy likely to provide a substantially optimum execution of the instruction group according to a preselected criterion. In another embodiment, the preselected criterion includes at least one of a successful completion of the instruction group, an unsuccessful completion of the instruction group, an uncertain completion of the instruction group, an exception, a time to execute the instruction group, a successful hit, an unsuccessful hit, a hit ratio, correctly predicting a branch taken, incorrectly predicting a branch taken, correctly predicting a branch not taken, and/or incorrectly predicting a branch not taken.

In an embodiment, the cache manager operable to select a management policy likely to provide a substantially optimum execution of the instruction group includes a cache manager operable to select a management policy predicted as likely to provide a substantially optimum execution of the instruction group. In another embodiment, the cache manager operable to select a management policy likely to provide a substantially optimum execution of the instruction group includes a cache manager operable to select a management policy predicted by a Bayesian method as likely provide a substantially optimum execution of the instruction group. In a further embodiment, the cache manager operable to select a management policy predicted by a Bayesian method as likely provide a substantially optimum execution of the instruction group includes cache manager operable to recall historical data from a ghost page.

In an embodiment, the cache manager operable to select a management policy likely to provide a substantially optimum execution of the instruction group includes a cache manager operable to select a management policy predicted by a heuristic as likely provide a substantially optimum execution of the instruction group. In another embodiment, the cache manager operable to select a management policy likely to provide a substantially optimum execution of the instruction group includes a cache manager operable to select a management policy predicted by a learning algorithm as likely provide a substantially optimum execution of the instruction group.

In operation, an embodiment of the device 500 provides an optimization of a processor and a cache when executing an instruction group. For example, when the first cache 521 and the second cache 522 are logical partitions of a physical memory, different cache management policies may be tried for the instruction group. The execution results of the instruction group are compared, and a cache management policy selected that provides a substantially optimum execution selected in response to the comparison. For example, the first and second management policies may provide different cache sizes. The instruction group may be executed on both processors while the different cache sizes are applied to the first cache and the second cache. The executions are compared, and a cache management policy selected that works better, i.e., provides a substantially optimum execution of the instruction group. In another example, the first and second management policies may provide different flush rates. A selected cache management policy is associated with the instructions group, for example by using a ghost page, for a use in a future execution of the instruction group.

Continuing with FIG. 10, FIG. 10 illustrates another exemplary embodiment of a device 500 in which an embodiment may be implemented. The device includes a first processor 510 having an associated first hardware resource and a second processor 514 having an associated second hardware resource. In an embodiment, the associated first hardware resource includes a first branch predictor 526 and the associated second hardware resource includes a second branch predictor 527. In another embodiment, the first and second hardware resources may include a memory, a bus, a register-file port, and/or a function unit, which are collectively illustrated as other resource(s) 528 and/or off-chip resource(s) 529.

The device 500 also includes hardware resource manager 542 implemented in a hardware-logic. The resource manager is operable to compare an execution of an instruction group by the first processor 510 while a first resource management policy is applied to the first hardware resource and an execution of the instruction group by the second processor 527 while a second resource management policy is applied to the second hardware resource. Continuing with an above example, the first hardware resource may include the first branch predictor 526 and the second hardware resource includes the second branch predictor 527. In an alternative embodiment, the first hardware resource includes a first off-processor-chip cache and the second hardware resource includes a second off-processor-chip cache 529.

The resource manager is also operable to select from the first resource management policy and the second resource management policy a resource management policy likely to provide a substantially optimum execution of the instruction group. The resource manager is further operable to associate the selected resource management policy with the instruction group. In an embodiment, the resource manager is associated with the first processor. In another embodiment, the resource manager is associated with the first processor and the second processor.

Figure 11:
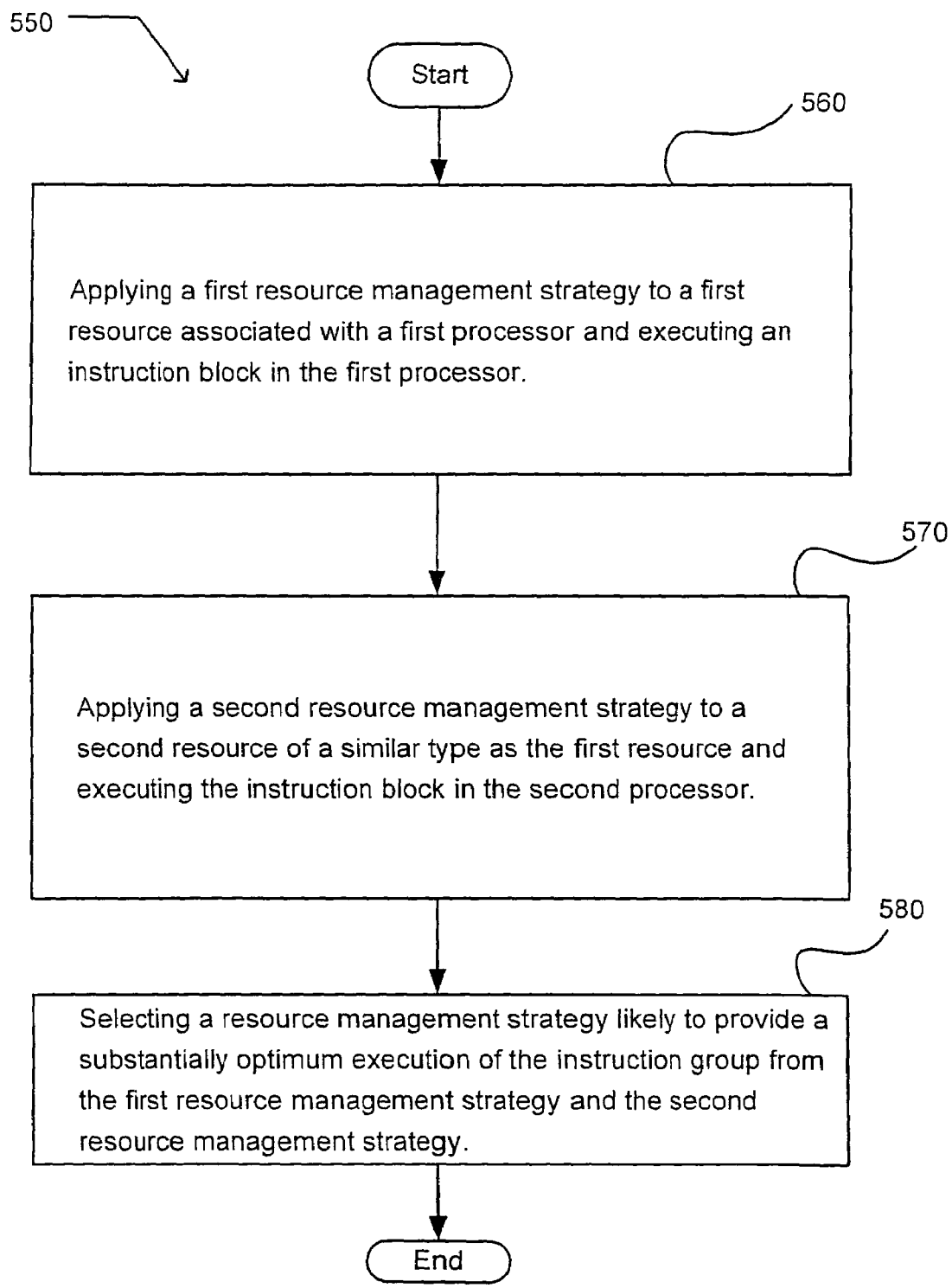
FIG. 11 illustrates a partial view of an exemplary operational flow in which embodiments may be implemented.

FIG. 11 illustrates a partial view of an exemplary operational flow 550 in which embodiments may be implemented. In an embodiment, the operational flow may be executed in the device 500 of FIG. 10. An operation 560 applies a first resource management strategy to a first resource associated with a first processor and executing an instruction block in the first processor. An operation 570 applies a second resource management strategy to a second resource of a similar type as the first resource and executing the instruction block in the second processor. An operation 580 selects a resource management strategy likely to provide a substantially optimum execution of the instruction group from the first resource management strategy and the second resource management strategy.

Figure 12:
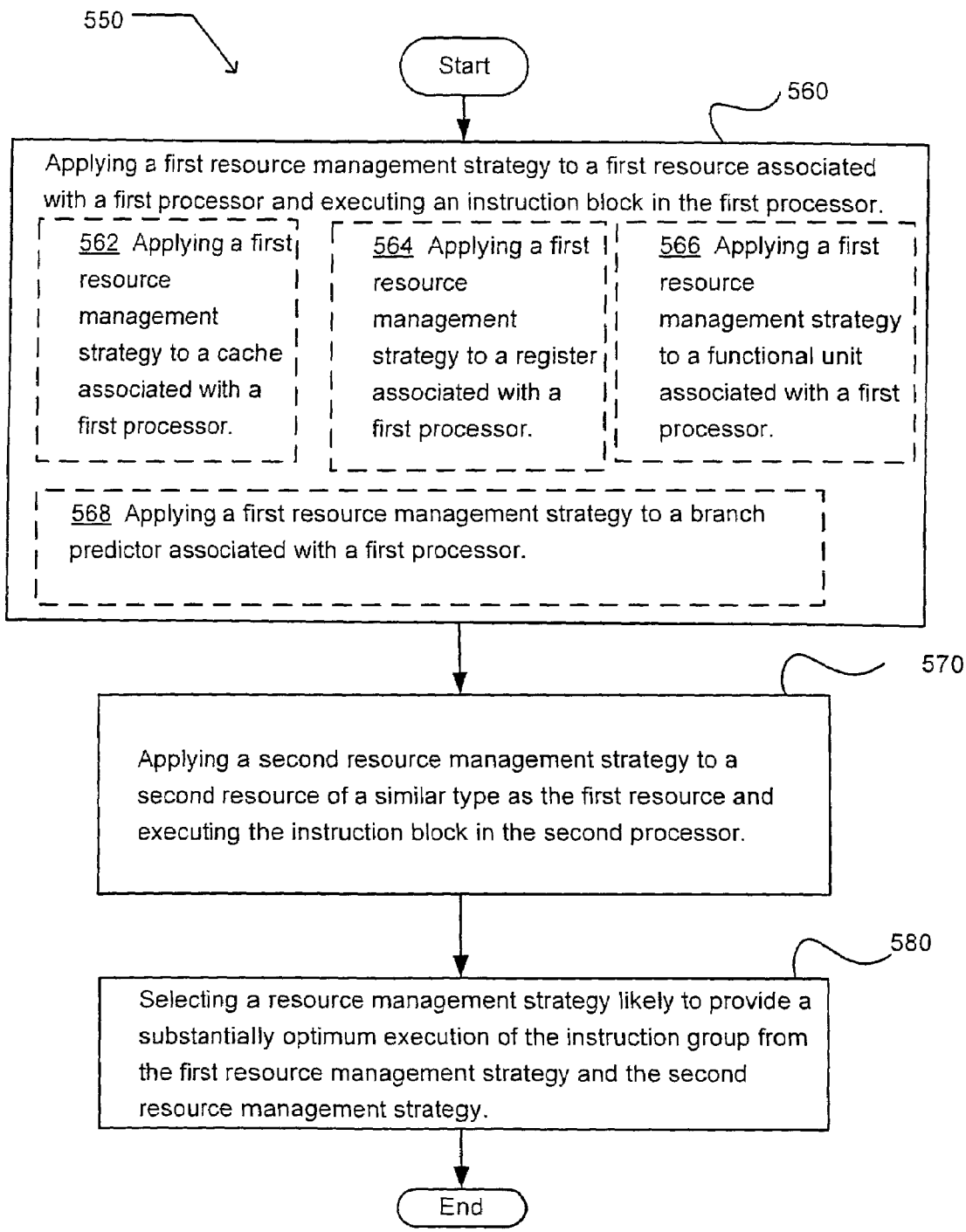
FIG. 12 illustrates alternative embodiments of the operation of FIG. 11.

FIG. 12 illustrates alternative embodiments of the operation 560 of FIG. 11. An operation 562 applies a first resource management strategy to a first resource associated with a first processor includes applying a first resource management strategy to a cache associated with a first processor. An operation 564 applies a first resource management strategy to a first resource associated with a first processor includes applying a first resource management strategy to a register associated with a first processor. An operation 566 applies a first resource management strategy to a first resource associated with a first processor includes applying a first resource management strategy to a functional unit associated with a first processor. An operation 568 applies a first resource management strategy to a branch predictor associated with a first processor.

Figure 13:
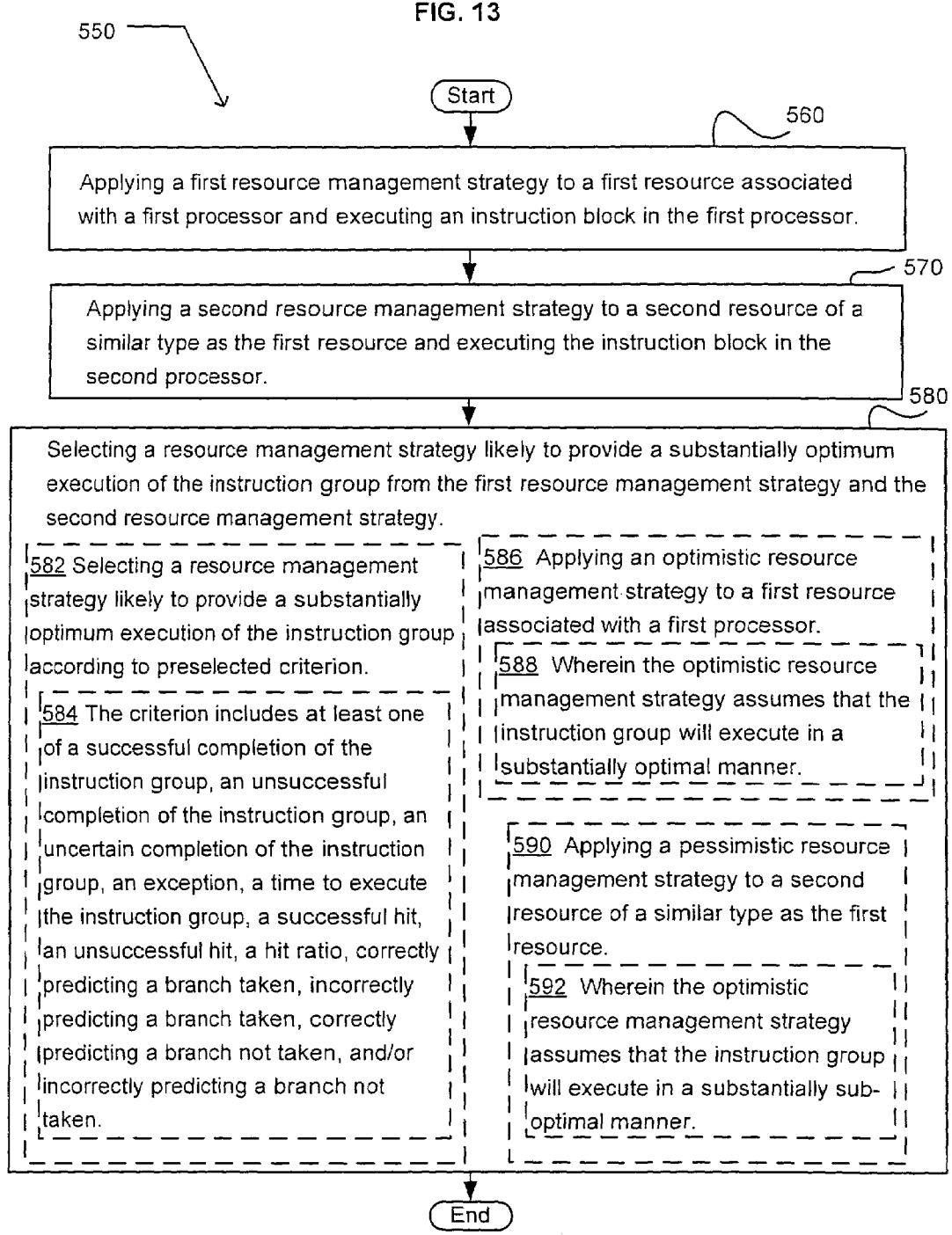
FIG. 13 illustrates alternative embodiments of the operation of FIG. 11.

FIG. 13 illustrates alternative embodiments of the operation 580 of FIG. 11. An operation 582 selects a resource management strategy likely to provide a substantially optimum execution of the instruction group according to preselected criterion. In an alternative embodiment, the operation 582 may include an operation 584. At the operation 584, the preselected criterion includes at least one of a successful completion of the instruction group, an unsuccessful completion of the instruction group, an uncertain completion of the instruction group, an exception, a time to execute the instruction group, a successful hit, an unsuccessful hit, a hit ratio, correctly predicting a branch taken, incorrectly predicting a branch taken, correctly predicting a branch not taken, and/or incorrectly predicting a branch not taken. An operation 586 applies a first resource management strategy to a first resource associated with a first processor includes applying an optimistic resource management strategy to a first resource associated with a first processor. In an alternative embodiment, the operation 586 may include an operation 588. At the operation 588, the optimistic resource management strategy assumes that the instruction group will execute in a substantially optimal manner. An operation 590 applies a pessimistic resource management strategy to a second resource of a similar type as the first resource. In an alternative embodiment, the operation 590 may include an operation 592. At the operation 592, the pessimistic resource management strategy assumes that the instruction group will execute in a substantially sub-optimal manner.

Figure 14:
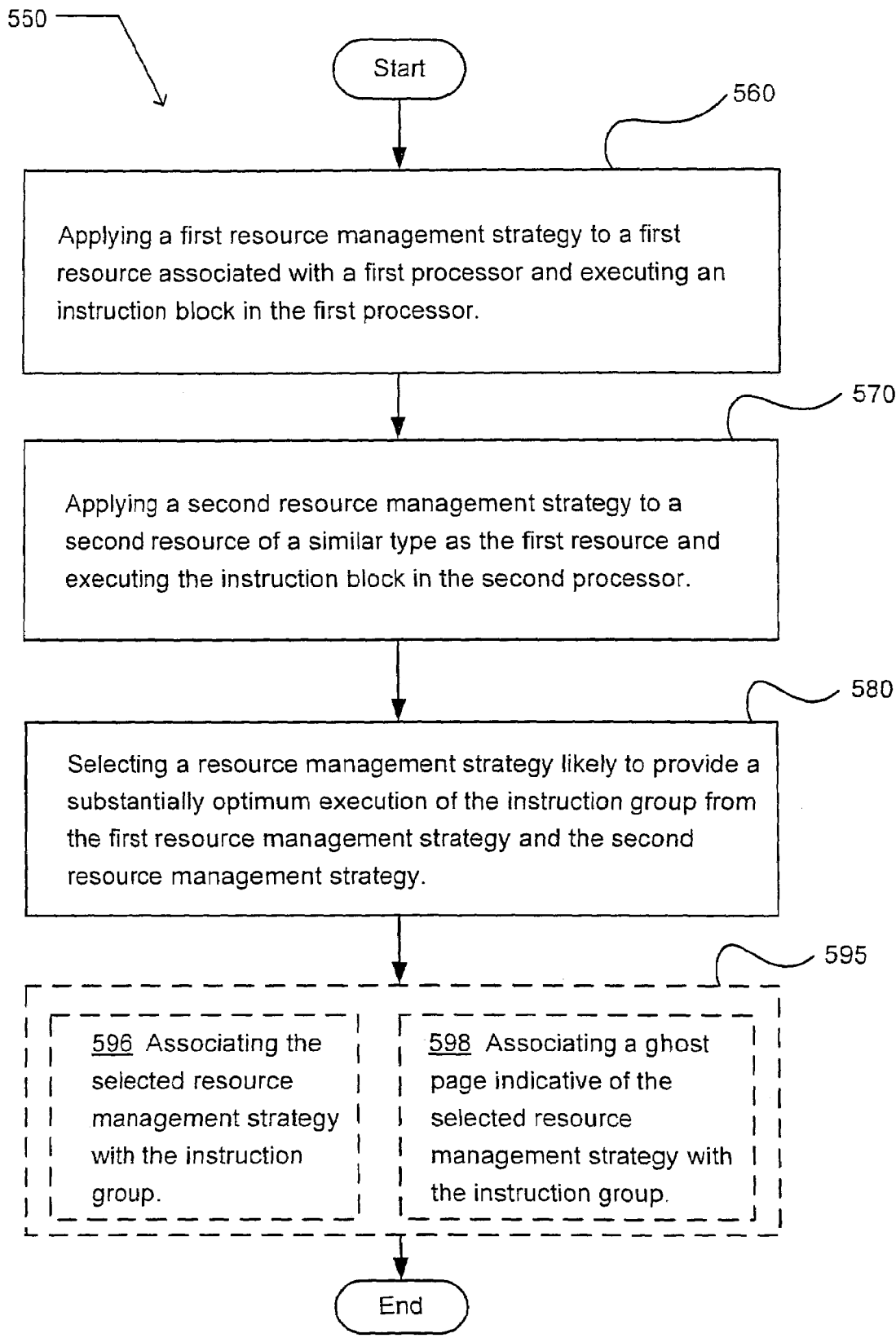
FIG. 14 illustrates alternative embodiments of the operational flow of FIG. 11.

FIG. 14 illustrates alternative embodiments 595 of the operational flow 550 of FIG. 11. An operation 596 associates the selected resource management strategy with the instruction group. An operation 598 associates a ghost page indicative of the selected resource management strategy with the instruction group.

Figure 15:
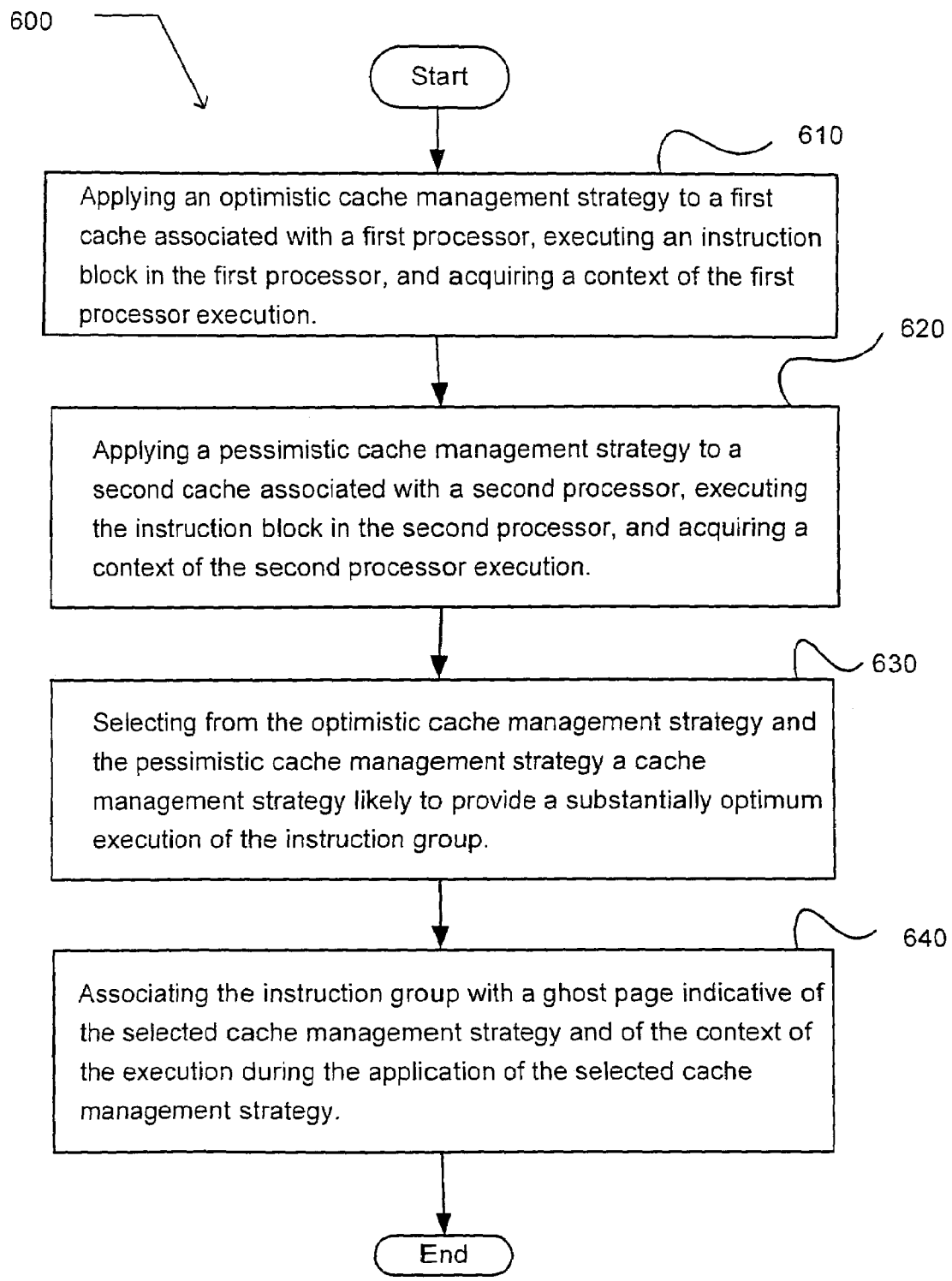
FIG. 15 illustrates a partial view of an exemplary operational flow in which embodiments may be implemented.

FIG. 15 illustrates a partial view of an exemplary operational flow 600 in which embodiments may be implemented. An operation 610 applies an optimistic cache management strategy to a first cache associated with a first processor, executing an instruction block in the first processor, and acquiring a context of the first processor execution. An operation 620 applies a pessimistic cache management strategy to a second cache associated with a second processor, executing the instruction block in the second processor, and acquiring a context of the second processor execution. An operation 630 selects from the optimistic cache management strategy and the pessimistic cache management strategy a cache management strategy likely to provide a substantially optimum execution of the instruction group. An operation 640 associates the instruction group with a ghost page indicative of the selected cache management strategy and of the context of the execution during the application of the selected cache management strategy.

Returning to FIG. 10, FIG. 10 also illustrates a further exemplary embodiment of the device 500. The device includes a processor, such as the first processor 510, having an associated first hardware resource, such as the first branch predictor 526, and a present context. The device also includes a control unit associated with the first processor core, such as for example the cache manager 540 or the hardware resource manager 542. The control unit is operable to fetch an instruction for execution by the processor. The control unit is also operable to receive a previously selected resource management policy associated with the instruction, the resource management policy selected as likely to provide a substantially optimum execution of an instruction group that includes the instruction, and further selected from a optimistic resource management policy and a pessimistic resource management policy. The control unit is further operable to apply the previously selected resource management policy to the resource, and cause the processor to execute the instruction.

In an alternative embodiment, the control unit operable to apply the previously selected resource management policy to th-e resource includes a control unit operable to apply the previously selected resource management policy only if a predetermined similarity exists between the present context of the processor and the context existing when the selected resource management policy was selected. Otherwise, the control unit does not apply the previously selected resource management policy to the resource.

Figure 16:
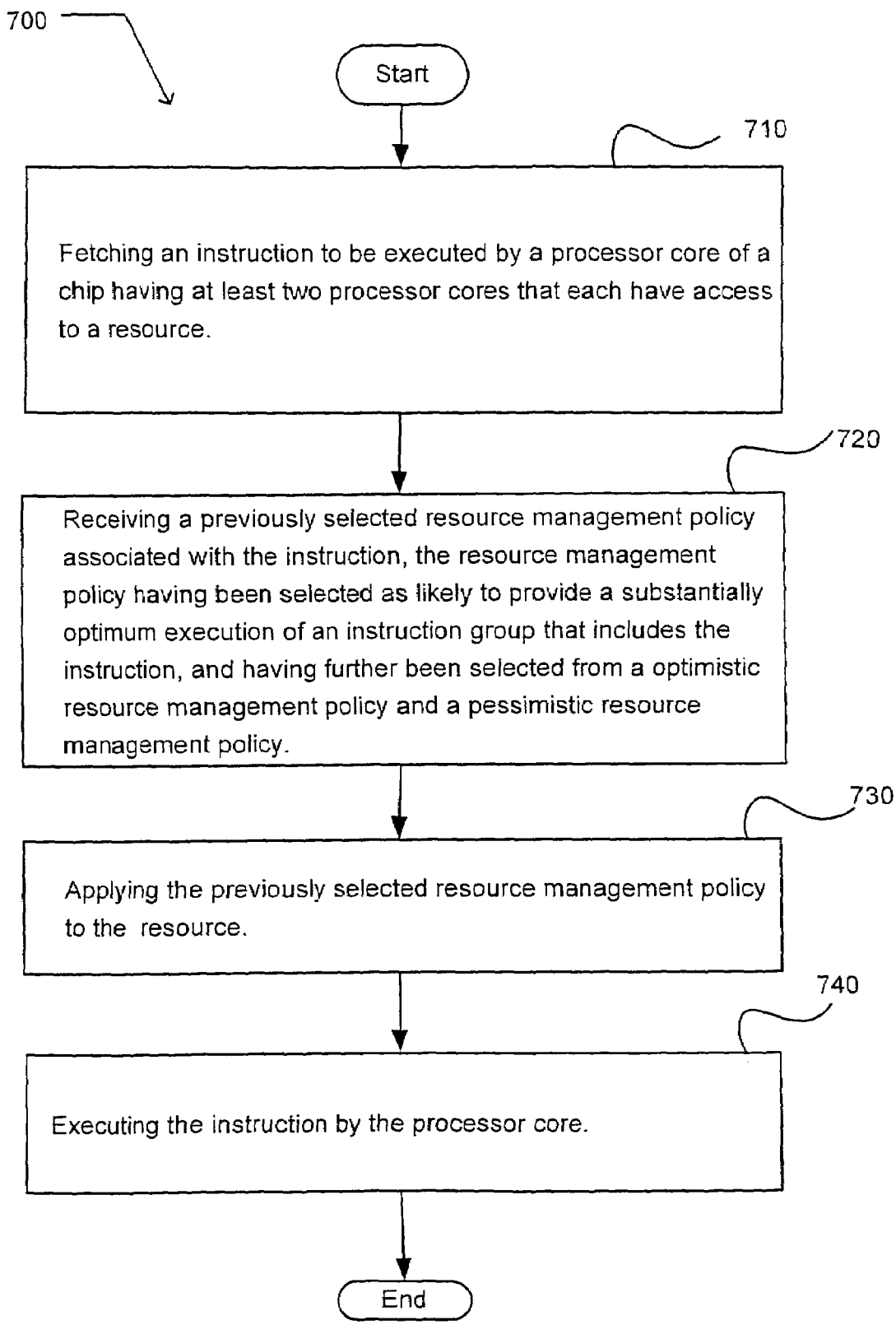
FIG. 16 illustrates a partial view of an exemplary operational flow in which embodiments may be implemented.

FIG. 16 illustrates a partial view of an exemplary operational flow 700 in which embodiments may be implemented. In an embodiment, the operational flow may be executed in the device 500 of FIG. 10. In another embodiment, an operation 710 fetches an instruction to be executed by a processor core of a chip having at least two processor cores that each have access to a resource. An operation 720 receives a previously selected resource management policy associated with the instruction. The resource management policy having, been selected as likely to provide a substantially optimum execution of an instruction group that includes the instruction, and having further been selected from a optimistic resource management policy and a pessimistic resource management policy. An operation 730 applies the previously selected resource management policy to the resource. An operation 740 executes the instruction by the processor core.

Figure 17:
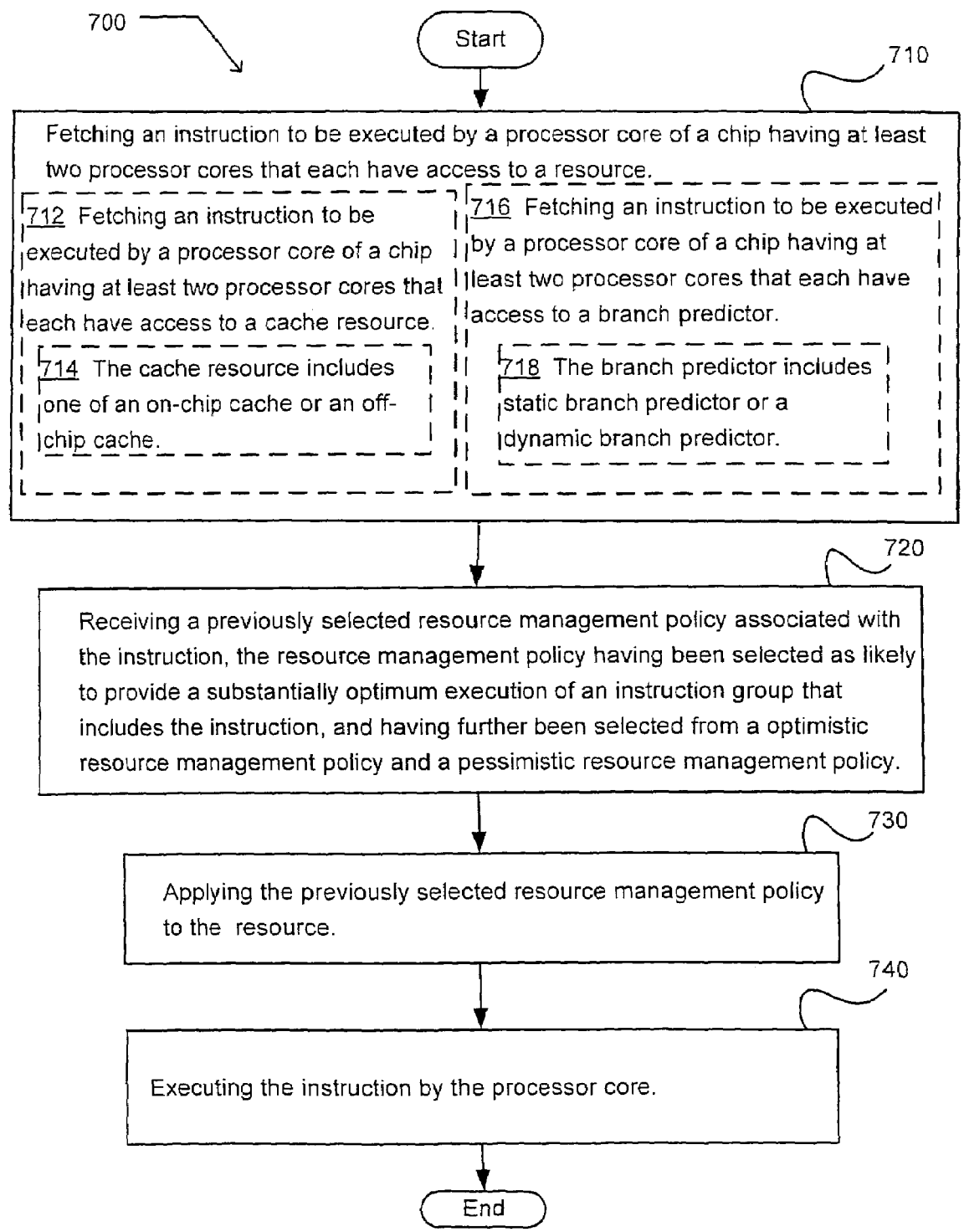
FIG. 17 illustrates alternative embodiments of the operation of FIG. 11.

FIG. 17 illustrates alternative embodiments of the operation 710 of FIG. 11. An operation 712 fetches an instruction to be executed by a processor core of a chip having at least two processor cores that each have an access to a cache resource. In another embodiment, the operation 712 includes an operation 714, where cache resource includes one of an on-chip cache or an off-chip cache. An operation 716 fetches an instruction to be executed by a processor core of a chip having at least two processor cores that each have access to a branch predictor. In another embodiment, the operation 716 includes an operation 718, where the branch predictor includes static branch predictor or a dynamic branch predictor.

Returning to FIG. 1, an alternative embodiment of the exemplary device 100 includes the processor 110 and the processor-associated hardware resource 120. The processor is operable to execute an instruction group. The resource manager 140 is operable to implement a resource management policy for the hardware resource with respect to an execution of the instruction group, the resource management policy responsive to a prediction of a performance of the hardware resource based at least in part on a historical performance of the hardware resource.

In an embodiment, the processor and the associated hardware resource are formed on a single chip. In another embodiment, the processor and resource manager are formed on a single chip. In a further embodiment, the hardware resource includes a cache, such as the cache 1 (121) or an off-chip cache illustrated as the off-chip resource 128. In an embodiment, the hardware resource includes a logical partition of a cache, such as the first cache 521 of the physical memory device 523 of FIG. 10. In another embodiment, the hardware resource includes the branch predictor 124, which may be a dynamic branch predictor. In a further embodiment, the hardware resource includes a hardware resource logically associated with the processor. In an embodiment, the hardware resource includes a hardware resource physically associated with the processor. In another embodiment, the hardware resource associated with the processor includes a hardware resource controlled by the processor.

In an embodiment, the resource management policy responsive to a prediction of a future performance of the hardware resource based at least in part on a historical performance of the hardware resource includes a resource management policy responsive to a prediction of a future performance of the hardware resource based at least in part on a historical performance of the hardware resource during an execution of the instruction group. By way of illustrative example, in an embodiment, a historical performance of the hardware resource may include a branch being taken an average 90% of the time over 1000 executions of the instruction group. The resource management policy may then include a prediction that the branch is taken. In another embodiment, the resource management policy responsive to a prediction of a performance of the hardware resource based at least in part on a historical performance of the hardware resource includes a resource management policy responsive to a prediction of a performance of the hardware resource based at least in part on a historical performance of the hardware resource and an indicia of confidence. Continuing with the above illustrative example, an indicia of confidence may include a high indicia of confidence because the branch has been taken 99% of the time in the last 10 executions of the instruction group. The resource management policy may then include a prediction that the branch is taken unless two subsequent instances of branch prediction error occur, resulting in a low indicia of confidence. Alternatively, an indicia of confidence may include a low indicia of confidence because the branch has been taken only 15% of the time in the last 10 executions of the instruction group. The resource management policy may then include a prediction that the branch is never taken. In another embodiment, the resource management policy responsive to a prediction of a performance of the hardware resource based at least in part on a historical performance of the hardware resource includes a resource management policy responsive to a prediction of a performance of the hardware resource based at least in part on a historical performance of the hardware resource and a saved indicia of confidence in the prediction of a performance of the hardware resource.

In a further embodiment, the resource management policy formulated in response to a prediction of a performance of the hardware resource based at least in part on a historical performance of the hardware resource includes a resource management policy formulated in response to a prediction of a performance of the hardware resource as likely to provide a substantially optimum execution of the instruction group. For example, the hardware resource may include a cache and the resource management policy includes a cache flush rate. In an embodiment, the resource management policy formulated in response to a prediction of a performance of the hardware resource based at least in part on a historical performance of the hardware resource includes a resource management policy formulated in response to a prediction of a performance of the hardware resource as likely to provide a substantially optimum execution of the instruction group as measured by a preselected criterion. In a further embodiment, the preselected criterion includes at least one of a successful completion of the instruction group, an unsuccessful completion of the instruction group, an uncertain completion of the instruction group, an exception, a time to execute the instruction group, a successful hit, an unsuccessful hit, a hit ratio, correctly predicting a branch taken, incorrectly predicting a branch taken, correctly predicting a branch not taken, and/or incorrectly predicting a branch not taken.

In an embodiment, the resource management policy formulated in response to a prediction of a performance of the hardware resource based at least in part on a historical performance of the hardware resource includes a resource management policy formulated in response to a prediction of a performance of the hardware resource based at least in part on a Bayesian method. In another embodiment, the resource management policy formulated in response to a prediction of a performance of the hardware resource based at least in part on a historical performance of the hardware resource includes a resource management policy formulated in response to a prediction of a performance of the hardware resource based at least in part on a heuristic algorithm. In a further embodiment, the resource management policy formulated in response to a prediction of a performance of the hardware resource based at least in part on a historical performance of the hardware resource includes a resource management policy formulated in response to a prediction of a performance of the hardware resource based at least in part on a learning algorithm. In an embodiment, the resource manager includes a resource manager operable to recall historical data from a ghost page.

In another embodiment, the device 100 further includes a storage device operable to save the historical performance of the hardware resource. In a further embodiment, the storage device operable to save the historical performance of the hardware resource includes a storage device operable to save the historical performance of the hardware resource and a measure of confidence in a prediction based on the historical performance.

Figure 18:
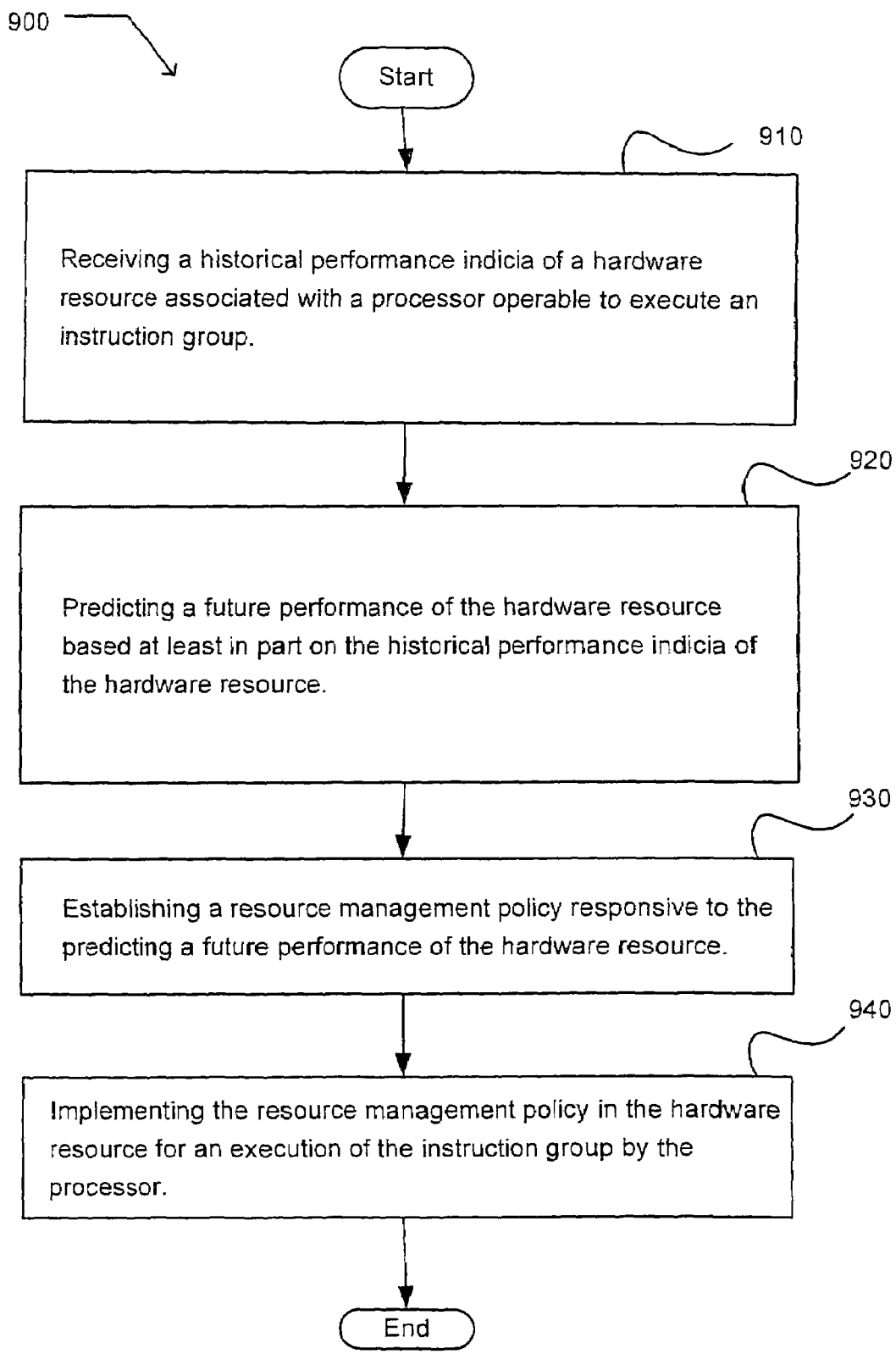
FIG. 18 illustrates a partial view of an exemplary operational flow in which embodiments may be implemented.

FIG. 18 illustrates a partial view of an exemplary operational flow 900 in which embodiments may be implemented. In an embodiment, the operational flow may be executed in the device 900 of FIGS. 1 and/or 10. In another embodiment, an operation 910 receives a historical performance indicia of a hardware resource associated with a processor operable to execute an instruction group. An operation 920 predicts a future performance of the hardware resource based at least in part on the historical performance indicia of the hardware resource. An operation 930 establishes a resource management policy responsive to the predicting a future performance of the hardware resource. An operation 940 implements the resource management policy in the hardware resource for an execution of the instruction group by the processor.

FIG. 19 illustrates alternative embodiments of the operation 920 of FIG. 18. An operation 922 predicts a future performance of the hardware resource at least in part based on the historical performance indicia of the hardware resource corresponding to an execution of the instruction group. An operation 924 predicts a future performance of the hardware resource based at least in part on the historical performance of the hardware resource and a confidence indicia.

Other embodiments are directed toward utilizing and/or optimizing data handling, which may be by a data class. In some instances, a data class includes certain data items (datum, byte, bit, a block of things that are associated together) that are used once and never again. In other instances, a data class includes certain data items are used constantly but never written and/or infrequently written. In further data classes, data items are constantly read and written to, or other data items are often being written but never read. A data manager (which may/may not be associated with and/or part of a resource manager) predicts how certain data classes will likely be used in the future and/or saves the data items in a manner and/or a location that substantially optimizes utilization of the data items by an instruction group and/or storage of the data items by the computing device. Any suitable type of predictive algorithm providing meaningful results may be used, including a predictive algorithm based on a Bayesian method, and/or a learning algorithm. The prediction may be written to a ghost page associated with a piece of data. A prediction may be straight forward if it is known that the data piece will never be written or read. Each data item will expose what its peculiar flavor is. This may be implemented down to the size of a single cache line, or even below the cache line.

An embodiment provides storage mobility for data items that are associated together in a substantial disequilibrium based upon a shared fate, a shared nature, an entanglement to a page and/or line of similarly handled data. The data item may include one or more extra bits (tag) on end of a data item that may indicate its size, nature (written but never read, read but never written, read once in the life of the program, used by at least two threads). In a further embodiment, an indicator may say which code relates with to the data item. This may be used for doing storage assignment. For example, if the data item includes a semaphore that is used across multiple threads, that should be known and the data item managed accordingly. Most data is associated with a particular body of code and assigned to a storage unit together. By watching that, these assignments can be done together between the I-cache and the D-cache.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood by those within the art that each function and/or operation within such block diagrams, operation diagrams, flowcharts, illustrations, or examples can be implemented, individually and/or collectively, by a wide range of hardware, software, firmware, or virtually any combination thereof.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is defined by the appended claims.

What is claimed is:

1. A device comprising:
   a processor having an associated hardware resource and a present context; and
   a control unit associated with the processor and operable to fetch an instruction of an instruction group for execution by the processor;
   receive a first and a second previously selected resource management policy associated in a computer-readable recordable medium with the instruction of the instruction group, the first previously selected resource management policy selected based on at least one of theoretical information or historical information as likely to provide a substantially optimum execution of the instruction group if the processor has a first predefined context, the second previously selected resource management policy selected based on at least one of theoretical information or historical information as likely to provide a substantially sub-optimum execution of the instruction group if the processor has a second predefined context, the first and the second previously selected resource management policy being received when the processor is scheduled to run the associated instruction of the instruction group;
   determine whether a predetermined correlation exists between the present context of the processor and one of the first and the second predefined context to identify a corresponding previously selected resource management policy; and
   apply the corresponding previously selected resource management policy.

2. A method comprising:
   fetching an instruction of an instruction group to be executed by a processor core of a chip having at least two processor cores that each have access to a resource;
   receiving a first and a second previously selected resource management policy that is logically associated in a computer-readable recordable medium with the instruction group, the first previously selected resource management policy having been selected based on at least one of theoretical information or historical information as likely to provide a substantially optimum execution of the instruction group if a first processor core has a first predefined context, the second previously selected resource management policy selected based on at least one of theoretical information or historical information as likely to provide a substantially sub-optimum execution of the instruction group if a second processor core has a second predefined context;
   identify a corresponding previously selected resource management policy if a predetermined correlation exists between a present context of the first processor core and the first predefined context or if predetermined correlation exists between a present context of the second processor context and the second predefined context;
   applying the identified corresponding previously selected resource management policy to the resource; and
   executing the instruction by the processor core.

3. The method of claim 2, wherein the fetching an instruction of an instruction group to be executed by a processor core of a chip having at least two processor cores that each have access to a resource includes fetching an instruction of an instruction group to be executed by the first and second processor cores that each have access to a cache resource.

4. The method of claim 3, wherein the cache resource includes one of an on-chip cache or an off chip cache.

5. The method of claim 2, wherein the fetching an instruction of an instruction group to be executed by a processor core of a chip having at least two processor cores that each have access to a resource includes a fetching an instruction of an instruction group to be executed by the first and second processor cores that each have access to a branch predictor.

6. The method of claim 5, wherein the branch predictor includes static branch predictor or a dynamic branch predictor.

7. The device of claim 1, wherein the hardware resource includes a memory cache.

8. The device of claim 1, wherein the hardware resource includes a branch predictor.

9. The device of claim 1, wherein the hardware resource includes at least one of a memory, a cache, a bus, a register-file, a port, and/or a functional unit.

10. The device of claim 1, wherein the control unit associated with the processor and operable to receive a first and a second previously selected resource management policy associated in a computer-readable recordable medium with the instruction group includes:
a control unit associated with the processor and operable to identify the corresponding previously selected resource management policy when a predetermined correlation exists between a present context of the first processor core and the first predefined context.

11. The device of claim 1, wherein the control unit associated with the processor and operable to receive a first and a second previously selected resource management policy associated in a computer-readable recordable medium with the instruction group includes:
a control unit associated with the processor and operable to identify the corresponding previously selected resource management policy when a predetermined correlation exists between a present context of the second processor core and the second predefined context.

12. The device of claim 1, wherein the control unit associated with the processor and operable to receive a first and a second previously selected resource management policy associated in a computer-readable recordable medium with the instruction group includes:
a control unit associated with the processor and operable to identify the first previously selected resource management policy as the corresponding previously selected resource management policy when a predetermined correlation exists between a present context of the first processor core and the first predefined context and when a predetermined correlation exists between a present context of the second processor core and the second predefined context.

13. The device of claim 1, wherein the control unit associated with the processor and operable to apply the previously selected resource management policy if a predetermined correlation exists between the present context of the processor and the predefined context includes:
a control unit associated with the processor and operable to apply the previously selected resource management policy when the processor is scheduled to run the associated instruction of the instruction group.

14. The device of claim 1, wherein the instruction group includes at least one of a functional instruction, a branching instruction, a memory instruction, and/or other instruction that may be executed by a processor.

15. The device of claim 1, wherein the instruction group includes at least one of a statement or a portion of a statement in a program.

16. The device of claim 1, wherein the instruction group includes at least two statements from a program.

17. The device of claim 1, wherein the instruction group includes at least one of a decoded instruction, a translated instruction, and/or a micro-operation.

18. The device of claim 1, wherein the control unit associated with the processor includes:
a control unit associated with the processor and operable to facilitate the processor executing the instruction.

19. A method implemented in a computing device, the method comprising:
fetching but are not enough an instruction of an instruction group for execution by a processor having an associated hardware resource and a first execution context;
receiving a previously selected resource management policy associated in a computer-readable recordable medium with the instruction group, the previously selected resource management policy having been selected based on at least one of theoretical information or historical information as likely to provide a substantially optimum execution of the instruction group if the processor has a predefined context;
applying the previously selected resource management policy if a predetermined correlation exists between the present context of the processor and the predefined context;
applying a second hardware resource management policy to the instruction of the instruction group to produce a second execution context, the second hardware resource management policy selected based on at least one of theoretical information or historical information as likely to provide a substantially sub-optimum execution of the instruction group if the processor has a second predefined context;
comparing the first and second execution contexts; and
selecting one policy of the previously selected hardware resource management policy and the second hardware resource management policy in response to comparing the first and second execution contexts, wherein the selected one policy is stored for retrieval at a run time that is scheduled for the instruction of the instruction group.

20. The method of claim 19, wherein the fetching an instruction of an instruction group for execution by a processor having an associated hardware resource and a present context includes:
fetching an instruction of an instruction group for execution by a processor having a present context and an associated hardware resource managed by the processor.

21. The method of claim 19, further comprising:
facilitating execution of the instruction by the processor.

22. A computing device comprising:
means for fetching an instruction of an instruction group for execution by a processor having an associated hardware resource and a present context;
means for receiving a first and a second previously selected resource management policy associated in a computer-readable recordable medium with the instruction group, the first previously selected resource management policy having been selected based on at least one of theoretical information or historical information as likely to provide a substantially optimum execution of the instruction group if the processor has a first predefined context, the second previously selected resource management policy selected based on at least one of theoretical information or historical information as likely to provide a substantially sub-optimum execution of the instruction group if the processor has a second predefined context; and
means for applying one of the first and the second previously selected resource management policy if a predetermined correlation exists between the present context of the processor and one of the first and the second predefined context.

23. The computing device of claim 22, further comprising: means for facilitating execution of the instruction by the processor.

24. A device comprising:
a processor having an associated hardware resource and a present context; and
a control unit associated with the processor and operable to fetch an instruction of an instruction group for execution by the processor;
receive a previously selected resource management policy associated in a storage device with the instruction group, the previously selected resource management policy selected based on at least one of theoretical information or historical information as likely to provide a substantially optimum execution of the instruction group if the processor has a predefined context in response to an application of a first test hardware resource management strategy to the hardware resource and to an application of a second test hardware resource management strategy to the hardware resource without a condition responsive to the application of the first test hardware resource management strategy, the second test hardware resource management policy selected based on at least one of theoretical information or historical information as likely to provide a substantially sub-optimum execution of the instruction group if the processor has a second predefined context, the previously selected resource management policy being associated with the instruction of the instruction group, and the previously selected resource management policy being received when the processor is scheduled to run the associated instruction of the instruction group; and
apply the previously selected resource management policy if a predetermined correlation exists between the present context of the processor and the first predefined context or apply the second test hardware resource management policy if a predetermined correlation exists between the present context of the processor and the second predefined context.

25. The device of claim 24, wherein the storage device includes a computer readable recordable medium.

* * * * *